United States Patent
Chen et al.

(10) Patent No.: US 11,803,404 B2
(45) Date of Patent: Oct. 31, 2023

(54) DEEP LEARNING ALGORITHM COMPILING METHOD, DEVICE, AND RELATED PRODUCT

(71) Applicant: Anhui Cambricon Information Technology Co., Ltd., Hefei (CN)

(72) Inventors: Liming Chen, Hefei (CN); Linyang Wu, Hefei (CN); Ziyi Wang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 188 days.

(21) Appl. No.: 17/419,440

(22) PCT Filed: Aug. 25, 2020

(86) PCT No.: PCT/CN2020/111068
§ 371 (c)(1),
(2) Date: Nov. 11, 2021

(87) PCT Pub. No.: WO2021/000970
PCT Pub. Date: Jan. 7, 2021

(65) Prior Publication Data
US 2022/0129289 A1    Apr. 28, 2022

(30) Foreign Application Priority Data
Jul. 3, 2019 (CN) .......................... 201910596132.8

(51) Int. Cl.
*G06F 9/455* (2018.01)
*G06F 8/41* (2018.01)
*G06N 3/045* (2023.01)

(52) U.S. Cl.
CPC ............ *G06F 9/4552* (2013.01); *G06F 8/427* (2013.01); *G06N 3/045* (2023.01)

(58) Field of Classification Search
CPC ........ G06F 9/4552; G06F 8/427; G06N 3/045
USPC ......................................................... 717/148
See application file for complete search history.

(56) References Cited

U.S. PATENT DOCUMENTS 10,635,421 B2 * 4/2020 Park ..................... G06F 9/4552

* cited by examiner

*Primary Examiner* — Hang Pan
*Assistant Examiner* — Bradford F Wheaton
(74) *Attorney, Agent, or Firm* — Getech Law LLC; Jun Ye

(57) ABSTRACT

The present disclosure relates to a deep learning algorithm compiling method and a device and a related product, the product comprising a controller unit, and the controller unit comprising: an instruction cache unit, an instruction processing unit, and a queue-storing unit. The instruction cache unit is configured to store computation instructions associated with artificial neural network operations. The instruction processing unit is configured to parse the computation instructions to obtain a plurality of operation instructions. The queue-storing unit is configured to store an instruction queue, which comprises: a plurality of operation instructions or computation instructions to be executed according to the front-to-rear sequence of the queue. By means of the described method, the present disclosure may improve the operation efficiency of the related product when carrying out neural network model operations.

15 Claims, 31 Drawing Sheets

| Attribute | Category | Meaning |
|---|---|---|
| Shape | Visible attribute | Dimension of multi-dimensional data, size of each dimension, arrangement sequence of each dimension in the host memory |
| Logical data type | Visible attribute | Precision of data stored in the host memory |
| Physical data type | Invisible attribute | Precision of data stored in the device memory |
| Physical layout | Invisible attribute | Layout of data in the device memory, such as alignment, splitting, arrangement sequence, etc. |

Fig. 3

| Tensor Type | Shape Sign | Sign Meaning |
|---|---|---|
| Convolution input and output | N<br>C<br>H<br>W | Batch size<br>Feature map number<br>Feature map height<br>Feature map width |
| Convolution weight | CO<br>CI<br>Kh<br>Kw | Output feature map number<br>Input feature map number<br>Convolution kernel height<br>Convolution kernel width |
| RNN input | T<br>N<br>C | Input sequence length (such as the number of words in a sentence)<br>Input sequence batch (such as the number of sentences)<br>Size of each sequence element (such as the length of a word) |

Fig. 4

| Operation type | Description | Support In-Place Algorithm | Operation type | Description | Support In-Place Algorithm |
|---|---|---|---|---|---|
| conv | Convolution | × | conv3d | 3-dimensional convolution | × |
| maxpool | Maximum pooling | × | avgpool | Average pooling | × |
| lrn | LRN | × | bn | Batch normalization | √ |
| active | Activation | √ | upsample | Up sampling | × |
| fc | Full connection | × | softmax | Softmax | × |
| scale | Pixel scaling | √ | reshape | Size reshaping | × |
| concat | Data concatenating | × | split | Data splitting | × |
| add | Tensor addition | √ | sub | Tensor subtraction | √ |
| mult | Tensor multiplication | √ | divide | Tensor division | √ |
| nop | Null operation | × | deconv | deconvolution | × |
| basicrnn | Basic RNN | × | lstmcell | Basic LSTM cell | × |
| grucell | GRU cell | × | roipool | roi pooling | × |
| transpose | Transposing | × | depthwiseconv | Depth wise convolution | × |

Fig. 5

| Interface | Interface Function |
|---|---|
| nclOperator nclCreateFusionOperator(string op_type_name) | Create a fusion operation |
| void nclAddFusionOperator(nclOperator fusion, nclOperator op) | Add sub-operations to be fused one by one |
| void nclSetFusionOperators(nclOperator fusion, nclOperator ops[]) | Add all sub-operations to be fused at a time |
| void nclAddFusionInput(nclOperator fusion, nclOperator op, int i) | Use the i-th input parameter of op as an input parameter of the fusion operation, i starts from 0 |
| void nclAddFusionOutput(nclOperator fusion, nclOperator op, int i) | Use the i-th input parameter of op as an input parameter of the fusion operation, i starts from 0 |
| void nclFuseOperator(nclOperator fusion) | Execute operation fusion |

Fig. 11

| Interface | Interface Function |
|---|---|
| void nclSaveOperator(nclOperator op, char op_type[]) | Store an offline operation |
| nclOperator nclCreateOperator(OpType type_string) | Create an operation from an offline cache |

Fig. 16

| | NCLAPI | TensorRT | cuDNN | MIOpen | ACL | MKL-DNN |
|---|---|---|---|---|---|---|
| Type | Mixed | Based on images | Based on operators | Based on operators | Mixed | Based on images |
| Programming paradigm | Mixed | Declarative | Imperative | Imperative | Mixed | Declarative |
| Support operation fusion | √ | √ | X | X | √ | √ |
| The number of supported operations | 26 | 22+ | 18+ | 9+ | 100+ | 34+ |
| Support operation customization | √ | √ | X | X | X | X |
| Support operation specialization | √ | √ | X | X | √ | √ |
| Variable operation parameter runtime | √ | X | √ | √ | X | X |
| Offline model | √ | √ | X | X | X | X |

Fig. 18

| Module | Function | Function Description |
|---|---|---|
| Memory management | malloc | memory allocation |
| | free | memory free |
| | memcpy | memory copy |
| | lock | memory lock |
| Device management | open | open a device |
| | close | close a device |
| | p2p | device communication |
| Execution control | invoke | asynchronous execution |
| | sync | operation synchronization |
| | schedule | task schedule |

Fig. 29

DEEP LEARNING ALGORITHM COMPILING METHOD, DEVICE, AND RELATED PRODUCT

CROSS-REFERENCE TO RELATED APPLICATION

This application is a US National Phase of a PCT Application No. PCT/CN2020/111068 filed on Aug. 25, 2020, which claims priority to Chinese patent application No. 201910596132.8, filed on Jul. 3, 2019, the entire contents of which are incorporated herein by reference.

TECHNICAL FIELD

The present disclosure relates to the technical field of deep learning, and in particularly to a deep learning algorithm compiling method, a device, and a related product.

BACKGROUND

In the field of artificial intelligence technology, neural network algorithms, which are very popular machine learning algorithms recently, have achieved good results in various fields such as image recognition, speech recognition, natural language processing, etc. As neural network algorithms develop, they become more complex. The model scale also increases gradually as a result of recognition improvement.

SUMMARY

In view of this, the present disclosure proposes a deep learning algorithm compiling method, a device, and a related product, which can improve the performance optimization effect of deep learning algorithms in the corresponding hardware platform.

According to a first aspect of the present disclosure, a deep learning algorithm compiling method is provided. The method includes: receiving operation data transferred by a deep learning programming library interface; obtaining an operation instruction included in the operation data; determining an instruction type of the operation instruction, and according to the determination result, executing a compilation operation corresponding to the instruction type to obtain a binary code of the deep learning algorithm.

According to a second aspect of the present disclosure, a compiling device for deep learning algorithms is provided, which includes: an operation data receiving module configured to receive operation data transferred by a deep learning programming library interface; an operation instruction obtaining module configured to obtain an operation instruction included in the operation data; a compilation module configured to determine an instruction type of the operation instruction, and execute a compilation operation corresponding to the instruction type according to the determination result to obtain a binary code of the deep learning algorithm.

According to a third aspect of the present disclosure, a deep learning operation device is provided, which includes the compiling device for deep learning algorithm as described in the second aspect. The deep learning operation device is configured to complete a preset deep learning operation.

According to a fourth aspect of the present disclosure, a combined operation device is provided, which includes the deep learning operation device as described in the third aspect, a universal interconnection interface, and other processing devices. The deep learning operation device and other processing devices interact with each other to jointly complete computational operations specified by the user.

According to a fifth aspect of the present disclosure, a deep learning chip is provided, which includes: the compiling device for deep learning algorithms as described in the second aspect; or, the deep learning operation device as described in the third aspect; or, the combined operation device as described in the fourth aspect.

According to a sixth aspect of the present disclosure, an electronic device is provided, which includes: the compiling device for deep learning algorithms as described in the second aspect; or the deep learning operation device as described in the third aspect; or, the combined operation device as described in the fourth aspect; or, the deep learning chip as described in the fifth aspect.

By receiving the operation data transferred by the deep learning programming library interface, the compilation operation corresponding to the instruction type can be executed to obtain the binary code of the deep learning algorithm according to the instruction type of the operation instruction in the operation data. With the use of the deep learning algorithm compiling method, the device, and the related product provided by various aspects of the embodiments of the present disclosure, the compilation process can be adaptively changed according to different types of operation instructions, thereby greatly improving compilation flexibility and efficiency, effectively improving the performance optimization effect of deep learning algorithms in corresponding hardware platforms, and then further improving the processing performance of deep learning processor.

Other features and aspects of the present disclosure will become clear based on the following detailed description of exemplary embodiments with reference to the accompanying drawings.

BRIEF DESCRIPTION OF THE DRAWINGS

The drawings are included in the specification and constitute a part of the specification. Together with the specification, the drawings illustrate exemplary embodiments, features, and aspects of the present disclosure, and are used to explain the principles of the present disclosure.

FIG. 3 is a block diagram showing the correspondence between the attribute, type, and meaning of tensor data according to an embodiment of the present disclosure.

FIG. 4 is a diagram showing the correspondence between tensor data and a symbol according to an embodiment of the present disclosure.

FIG. 5 is a diagram of a build-in operation instruction supported by NCLAPI according to an embodiment of the present disclosure.

FIG. 11 is a diagram of related programming interfaces for operation fusion according to an embodiment of the present disclosure.

FIG. 16 is a diagram of offline interfaces according to an embodiment of the present disclosure.

FIG. 18 is a diagram of comparison between NCLAPI and mainstream deep learning programming library interfaces according to an embodiment of the present disclosure.

FIG. 29 is a diagram of modules and functions of a runtime system according to an embodiment of the present disclosure.

DETAILED DESCRIPTION

Figure 1:
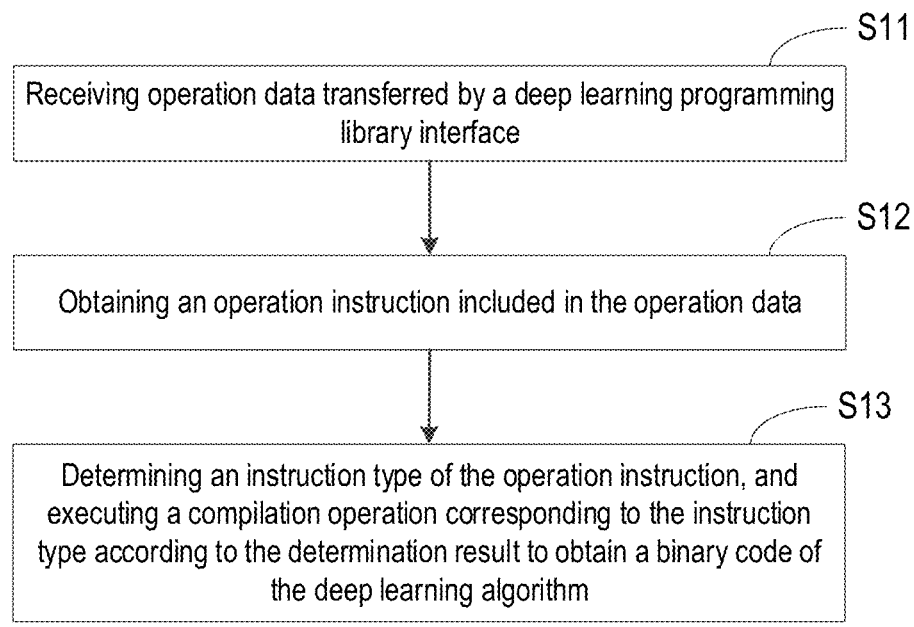
FIG. 1 is a flowchart of a deep learning algorithm compiling method according to an embodiment of the present disclosure.

Exemplary embodiments and the features and aspects thereof will be described in detail below with the accompanying drawings. The same reference symbols in the drawings indicate elements with the same or similar functions. Although various aspects of the embodiments are shown in the drawings, unless otherwise noted, the drawings are not necessarily drawn to scale.

The dedicated word "exemplary" here means "serving as an example, an embodiment, or being illustrative." Any embodiment described herein as "exemplary" should not be construed as being superior or better than other embodiments.

In addition, in order to better illustrate the present disclosure, many details are given in the following embodiments. Those skilled in the art should understand that the present disclosure can also be implemented without some specific details. In some embodiments, the methods, means, elements, and circuits well-known to those skilled in the art are not described in detail in order to highlight the gist of the present disclosure.

In order to alleviate the deteriorating problem of memory wall, an on-chip memory is usually placed near an operation unit of a deep learning processor, so that the latency of accessing the on-chip memory is much lower than that of accessing an off-chip memory. Therefore, the proper utilization of on-chip memory is the key to bringing into full play of the performance of a deep learning processor. However, the on-chip memory does not have the functions of the cache, such as data pre-fetching, data replacement, and processing of data conflicts. These tasks must be completed by instructions written by programmers. On the other hand, the on-chip memory capacity is very limited, and programmers must split operations and data at the same time, which lead to tight coupling of operations and data. Taking a deep learning processor as an example, the capacity of the on-chip neuron memory (NBin) of the processor is only 2 KB, while a RGB half-precision image of 1080P needs to occupy 12 MB. In this case, only the input data needs to be split to 6K times for loading, and data splitting also requires operations to be split, for example, the count of nested loops will increase, and the count of iterations of inner loops will decrease.

The characteristics of on-chip memory (display management and limited capacity) and the characteristics of deep learning algorithms (complex and changeable processing layers, diversified operation data types, processing high-dimensional tensors, etc.) lead to the problem that program optimization is extremely sensitive to the changes in algorithm and hardware. Taking a 2-dimensional convolution operation as an example, the operation contains at least 9 types of shape parameters (N, CI, HI, WI, CO, Kh, Kw, Sh, Sw), 7 nested loops, and multiple types of operation precision (half, fxm. b, Qts.b, intx, etc.), a combination of the above parameters or changes in the on-chip memory capacity will affect the optimal splitting strategy of data and operation, resulting in a different binary code.

It can be inferred from the reasons above that due to the particularity of deep learning algorithms and the particularity of deep learning processor architecture, the program optimization in the deep learning field has two important features, which are: extreme sensitivity to changes in algorithms and hardware, and a high degree of coupling between operation and data. Since program optimization in the field of deep learning is extremely sensitive to changes in algorithm and hardware, it is difficult to meet the performance requirements of different algorithms and different hardware platforms through ahead-of-time compilation (AOT) optimization. Therefore, it has become an urgent problem to be solved that how to propose a deep learning algorithm compiling method based on the particularity of deep learning algorithms and the particularity of deep learning processor architecture.

FIG. 1 is a flowchart of a deep learning algorithm compiling method according to an embodiment of the present disclosure. As shown in the figure, the method includes:

a step S11, receiving operation data transferred by a deep learning programming library interface;

a step S12: obtaining an operation instruction included in the operation data; and a step S13, determining an instruction type of the operation instruction, and executing a compilation operation corresponding to the instruction type according to the determination result to obtain a binary code of the deep learning algorithm.

In the disclosed embodiment above, the binary code is a hardware instruction used to guide the hardware device to execute the deep learning algorithm. The embodiment of the present disclosure does not limit the hardware device to be guided and the specific content of the hardware instruction. They can be set flexibly based on actual conditions.

By receiving the operation data transferred by the deep learning programming library interface, the compilation operation corresponding to the instruction type can be executed to obtain the binary code of the deep learning algorithm according to the instruction type of the operation instruction in the operation data. With the use of the deep learning algorithm compiling method, the device, and the related product provided by various aspects of the embodiments of the present disclosure, the compilation process can be adaptively changed according to different types of operation instructions, thereby greatly improving compilation flexibility and efficiency, effectively improving the performance optimization effect of deep learning algorithms in corresponding hardware platforms, and then further improving the processing performance of deep learning processor.

The specific implementation source of the operation data that is received in the step S11 and that is transferred by the deep learning programming library interface is not limited. In a possible implementation manner, the operation data can be created or called according to a user instruction received by the deep learning programming library interface.

The process that the operation data can be created or called according to the user instruction received by the deep learning programming library interface and the operation data can be used to obtain the binary code of the deep learning algorithm subsequently provides users with a universal programming interface. In this way, effective conversion between user instructions and machine instructions can be realized.

Figure 2:
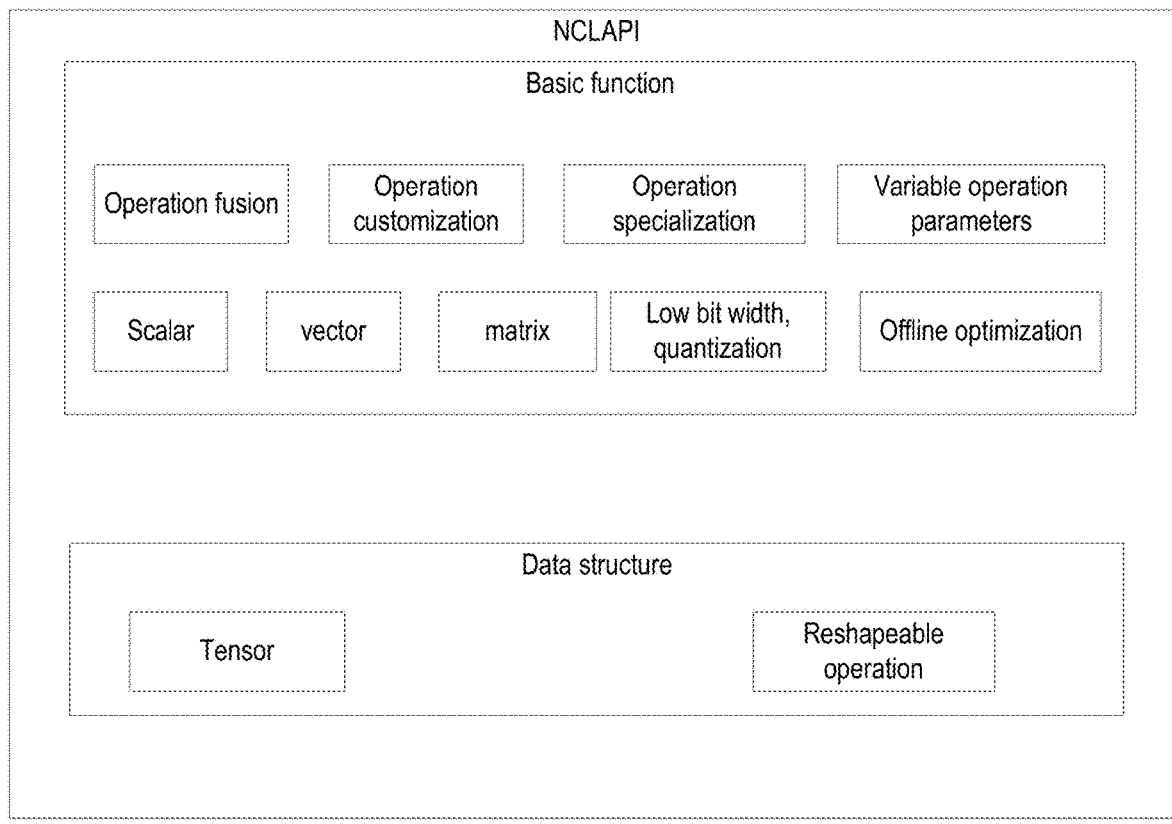
FIG. 2 is a diagram of an overall architecture of a neurological calculus library API according to an embodiment of the present disclosure.

In the steps above, the implementation manner of the deep learning programming library interface is not limited and can be flexibly selected according to the actual situation. In a possible implementation manner, the deep learning programming library interface can be a neurological calculus library API (NCLAPI). The specific implementation manner of the interface can be determined according to the actual situation, and is not limited to the following embodiments disclosed. FIG. 2 is a diagram of an overall architecture of a neurological calculus library API according to an embodiment of the present disclosure. As shown in the figure, in an embodiment, the implementation manner of the NCLAPI may be: simulating neurological calculus to give the NCLAPI better deep learning modeling capabilities; flexibly supporting various performance optimizations by designing reshapeable operations and corresponding operation rules; improving the flexibility of programming models by designing hybrid programming models; and simplifying the design of data structure and interface to hide the hardware details in the data structure and interface.

In the disclosed embodiment above, neurological calculus is a functional deep learning modeling method. In an example, the neurological calculus can use tensors to represent input data, output data and model parameters of an input layer, and use functions to represent a depth learning processing layer. The functions can be combined according to certain rules to construct various deep learning computation models. Since a function itself has composability and reusability, neurological calculus can well express the composability and reusability of deep learning algorithms. Neurological calculus designed according to the ideas above has powerful deep learning modeling capabilities. Currently known deep learning frameworks such as Tensor and Mxnet all use directed graphs to model deep learning computation models. It can be proved by experiments that any directed graph can be mapped into a function combination, and any function combination can be mapped into a directed acyclic graph, so neurological calculus has the same deep learning modeling capabilities as directed graphs. In an example, the simulating of neurological calculus gives NCLAPI good deep learning modeling capabilities. Therefore, with an appropriate simulation method, NCLAPI can have the same learning modeling capabilities as directed graphs.

As can be seen from FIG. 2 that in an example, NCLAPI can have two data structures, which are tensors (nclTensor) and reshapeable operation (nclOperator). nclTensor is used to describe input data, output data, and model parameters of a deep learning processing layer. ncloperation instruction is used to describe a deep learning processing layer. These two data structures simulate tensors and functions of neurological calculus, and some modifications and extensions have been made according to the actual programming model.

It can be seen from the step S11 that in the deep learning algorithm compiling method provided in the embodiment of the present disclosure, the operation data transferred by the deep learning programming library interface needs to be received first, and the disclosed embodiment above also proposes that, in an example, the deep learning programming library interface can be NCLAPI. There can be two data structures in NCLAPI, which are tensors and reshapeable operations. Therefore, in a possible implementation, the operation data transferred by the deep learning programming library interface can be tensor data corresponding to the nclTensor data structure, can be an operation instruction corresponding to the ncloperation instruction data structure, or can contain both tensor data and an operation instruction.

In a possible implementation, the tensor data in NCLAPI is an abstract representation of multi-dimensional data, which can be used to represent input data, output data, and model parameters of a deep learning processing layer. In an example, input, output, and weight data of a convolution layer can be represented as tensor data. Therefore, in a possible implementation manner, tensor data can have the following characteristics: have several attributes; can describe multi-dimensional data such as scalar, vector, matrix, and tensor; following a certain naming rule; and can describe a plurality of data types.

The disclosed embodiment above propose that tensor data follows a certain naming rule. The naming rule can be flexibly set according to actual conditions and is not limited to the disclosed embodiments below. In a possible implementation manner, tensor data may follow a naming rule which is: only include letters, numbers, and underscores; the first character must be an English letter; punctuation marks and type specifiers cannot be included.

Since the deep learning computation model usually handles fixed-size data, in an example of an image classification model AlexNet, input and output data shape of each processing layer is fixed, and a value of data will change frequently with the input. Therefore, data attributes and the data value have completely different update frequencies. From the perspective of data structure reuse and programming flexibility, the data attributes should be decoupled from the data value. Therefore, in a possible implementation manner, the tensor data in the embodiment of the present disclosure is only for describing the data attributes, the data value can be described by a pointer that points to the memory area, and the neurological calculus tensor can be completely mapped through a combination of tensor data and pointer.

It has been proposed in the disclosed embodiments above that the characteristic of tensor data is that it can have multiple types of attributes. The attributes can be flexibly set and selected according to actual conditions. In a possible implementation manner, the tensor data may include a shape attribute (shape), a logical data type attribute (dtype), a physical data type attribute (pdtype), and a physical layout attribute (layout).

By setting the four attributes of tensor data, which include the shape attribute, the logical data type attribute, the physical data type attribute, and the physical layout attribute, various data in deep learning algorithms can be described sufficiently and well, so that the compiling method can be well adapted to various data situations in deep learning algorithms and the versatility of the compiling method can be improved.

During the application process, the attributes above can be further classified based on the use of tensor data, and a specific classification method can also be set according to the actual situation. FIG. 3 is a block diagram showing the correspondence between the attribute, type, and meaning of tensor data according to an embodiment of the present disclosure. As shown in the figure, in an example, the four attributes can be divided into two categories: visible attributes and invisible attributes. The shape attribute and the logical data type attribute can be classified as visible attributes. During use, the visible attributes can be set through a tensor assignment interface. The physical data type attribute and the physical layout attribute can be classified as invisible attributes, which can be maintained, modified and used inside the programming library, so that the hardware details can be shielded from the outside and the programming complexity can be reduced.

It can be seen from FIG. 3 that the physical data type attribute can be used to indicate the precision of the data stored in the memory of the hardware device, and the logical data type attribute can be used to indicate the precision of the data stored in the memory of the host. Therefore, the precision represented by the physical data type attribute and the precision represented by the logical data type attribute can be the same or different. In a possible implementation manner, the physical data type data attribute and the logical data type attribute can be different. At this time, the compiling process can be set to realize the automatic precision selection function, that is, during the compiling process, a data type that is fastest in running speed can be automatically selected for computation, and the process can be transparent to users. The specific implementation process of the automatic precision selection function can be determined according to the actual situation, and will be described in detail in the subsequent disclosed embodiments.

The above disclosed embodiment also proposes that tensor data can describe multiple data types. The data types to be described can be determined flexibly according to the actual situation. In a possible implementation manner, tensor data can describe low bit-width, quantization, and other types of data. In order to enable tensor data to support low bit-width and quantization, the embodiments of the present disclosure propose designs of different data types (including the logical data type and the physical data type) for tensor data, including:

double-precision floating point: double; single-precision floating point: float; half-precision floating point: half; fixed point: fxm.b (m denotes integer digits, b denotes total digits); quantization: Qts.b (s denotes scale, which is a tensor scaling factor; b denotes the bias of tensor); integer: intx; unsigned integer: uintx.

The deep learning algorithm can support channel-wise quantization of images, and the scale and the bias of each channel can be different. Although quantization by channel cannot be described by Qts.b, the scale and add operations provided by NCLAPI can be used instead. Therefore, NCLAPI's ability to express quantization is still complete. In addition, considering that other data types may appear in the future, NCLAPI can also support the expansion of data types described by tensor data.

It has been proposed in the disclosed embodiments above that nclTensor is used to describe input data, output data, and model parameters of a deep learning processing layer. Since tensor data corresponds to nclTensor, the most common deep learning processing layers are convolution, pooling, and RNN layers, of which input data, output data, and model parameters are all high-dimensional data. FIG. 4 shows a correspondence between tensor data and a symbol according to an embodiment of the present disclosure. As shown in the figure, in a possible implementation manner, the shape of tensor data operated in a deep learning operation can be set according to the correspondence shown in the figure.

It has been proposed in the disclosed embodiments above that the operation data can be created or called according to the user instruction received by the deep learning programming library interface, and tensor data, as a possible implementation of the operation data, can thus be created or called. Tensor data must be created before use. The specific process of creation and calling can be flexibly set according to the actual situation. In a possible implementation manner, the calling process can be to assign a value to tensor data. In a possible implementation manner, the creation process can be to initialize the visible attributes of tensor data when the tensor data is created. In a possible implementation manner, since deep learning frameworks such as Tensor decouple data object creation and attribute settings, in order to avoid the creation process from being integrated into a deep learning framework without destroying the code structure of the deep learning framework, the creation process can be: first creating an uninitialized tensor data, and then calling the tensor assignment interface (nclSet-TensorAttr) for attribute assignment.

In a possible implementation manner, an operation instruction in NCLAPI is an abstract representation of transformation, which can be used to represent a deep learning processing layer, or can be used to represent general computations. In an example, an operation instruction can be used to represent a deep learning processing layer such as convolution, pooling, full connection, etc. In an embodiment of the present disclosure, operations to be performed by an operation instruction may be collectively referred to as reshapable operations.

In a possible implementation manner, an operation instruction can be composed of three parts, which are input parameters (input params), output parameters (output params), and an operation type (OpType). The input parameters correspond to an input tensor set of the transformation, that is, the input parameters can be nclTensor and pointers corresponding to all input data. The output parameters correspond to an output tensor set of the transformation, that is, the output parameters can be nclTensor and pointers corresponding to all output data. The implementation manner of the input parameters and the output parameters is not limited. In an example, it can be stipulated that an operation instruction may allow zero or a plurality of tensor data or pointers as input parameters, and one or a plurality of tensor data or pointers as input parameters as output parameters.

The operation type can be used to specify what kind of data transformation the operation instruction performs. Users can specify different operation types when creating operation instructions. These operation types can express three types of data transformations: value transformation, attribute transformation, and null transformation. Therefore, operation instructions can not only describe a deep learning processing layer, but also describe general computations such as data segmentation, data splicing, and size scaling.

The deep learning programming library interface can provide a series of own operation instructions that are set in advance. In an embodiment of the present disclosure, for the NCLAPI, these operation instructions can be called build-in operation instructions (build-in operators). FIG. 5 is a diagram of a build-in operation instruction supported by NCLAPI according to an embodiment of the present disclosure. It can be seen from the figure that an operation instruction that supports an in-situ algorithm is a build-in operation instruction supported by NCLAPI.

The properties of an operating instruction can be flexibly set according to the actual situation. In a possible implementation manner, in order to make the behavior of a program easier to analyze and predict, except for a build-in operation instruction, other operation instructions can be unidirectional, non-intersecting, and idempotent. Unidirectional means that an operation instruction does not change input parameters (including tensor data and pointer data). Non-intersecting means that input parameters and output parameters of an operation instruction must not have the same name. Idempotent means that a result of an operation instruction calling depends only on input parameters and is not affected by the count of calls.

It has been proposed in the disclosed embodiments above that the operation data can be created or called according to the user instruction received by the deep learning programming library interface, and an operation instruction, as a possible implementation of the operation data, can thus be created or called. The specific process of creation and calling can be flexibly set according to the actual situation. In a possible implementation manner, an operation instruction needs to be created before being called. The calling of an operation instruction refers to mapping an operation instruction to the deep learning processor for execution. By default, operation parameters of the operation instruction are variable at runtime, which means that, the operation instruction creation only needs to be done once while the operation instruction calling can be repeated, and different input parameters and output parameters can be specified each time the operation instruction is called.

In a possible implementation manner, in order to optimize program performance, NCLAPI can support two important functions when executing operation instruction calling, which are asynchronous execution and automatic precision selection.

In an example, asynchronous execution means that an operation instruction calling function will be returned immediately after being called by a host side. CPU can perform other operations while the deep learning processor is performing computations, thereby improving the overall utilization rate of the system and program performance. In order to ensure the completion of asynchronous calling execution, NCLAPI provides a device synchronization interface nclSyncDevice, which can block the execution of CPU until the device finishes the operation.

Figure 6:
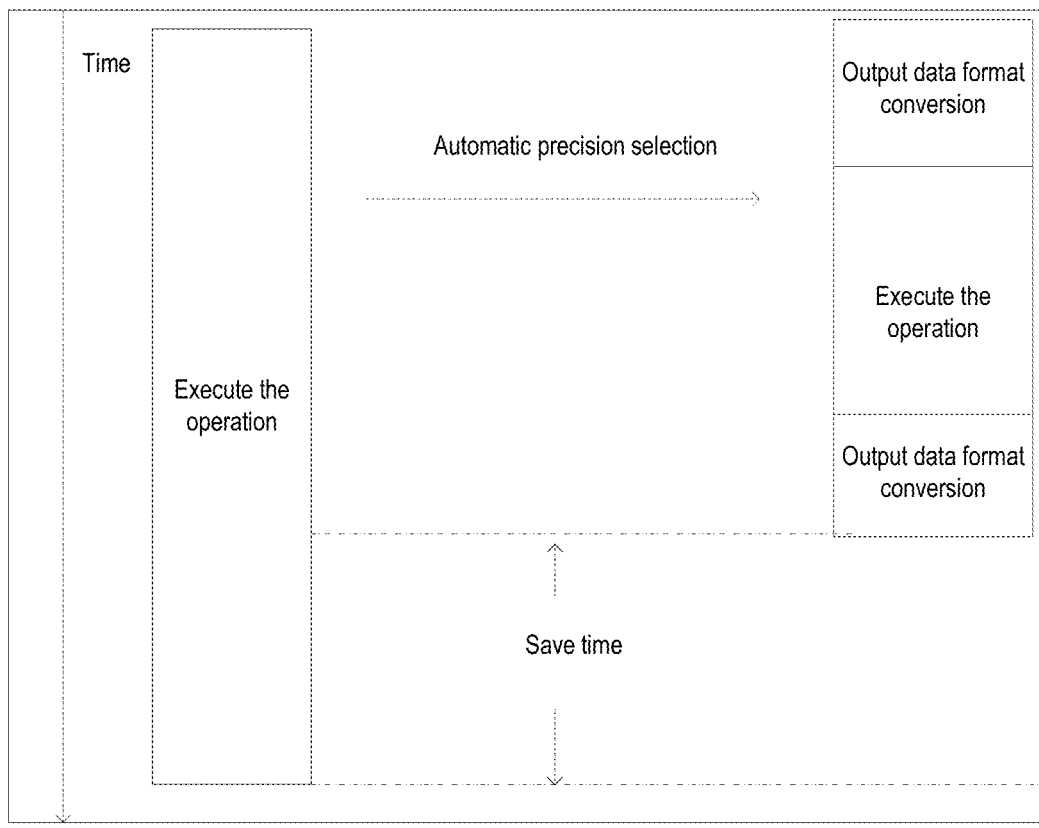
FIG. 6 is a diagram of an implementation of automatic precision selection according to an embodiment of the present disclosure.

FIG. 6 is a diagram of an implementation of automatic precision selection according to an embodiment of the present disclosure. As shown in the figure, in an example, automatic precision optimization means that before an operation instruction is executed in a device, the programming library automatically selects a data type with the shortest execution time, and executes an operation after converting original data into the optimal format. The time overhead of data format conversion and operation instruction execution are considered during automatic precision selection to ensure that the overall execution time of the operation is the shortest. In addition, in order to meet the unidirectional and idempotent nature of the operation, the programming library will apply for temporary space for data format conversion to ensure that the original input data will not be overwritten.

In a possible implementation manner, an operation instruction can also support operation connection. Operation connection means that output parameters of an operation instruction A can be used as input parameters of an operation instruction B, B processes the output of A after A completes computation. A necessary and sufficient condition for the two operation instructions A and B to be connected is that they each have at least one output tensor T1 and one input tensor T2, and the attributes of T1 and T2 are exactly the same. Operation connection is directional, and the direction of connection is from the operation that provides data to the operation that uses data.

In a possible implementation manner, a deep learning computation model can be expressed as a combination of functions. A combination of functions is a function sequence where functions are connected unidirectionally (in the combination of functions, the direction of the function connection can only be left-to-right). Since an operation instruction can be obtained by function mapping, a deep learning computation model can be expressed as an operation instruction sequence with only one-way operation connection (in the operation instruction sequence, the direction of operation instruction connection can only be left-to-right). In an embodiment of the present disclosure, this kind of operation instruction sequence is called a unidirectional operation sequence. A directed graph can be converted into a unidirectional operation sequence according to a certain algorithm. In addition, in order to avoid an in-situ algorithm from destroying the unidirectional nature of the operation, a tensor alias technique can be used to eliminate an in-situ operation.

In an example, an algorithm for converting a directed graph into a unidirectional operation instruction sequence may be: first, converting a directed graph g into a directed acyclic graph g'; then topologically sorting the directed acyclic graph g' to obtain:

$$g''(V\{vertex_1, vertex_2, \ldots, vertex_n\}, E)$$

mapping vertexes in the graph g'' into an operation instruction sequence in order; mapping edges in g'' into a tensor, adding an directed edge that flows out of the vertex to output parameters of the vertex, and adding the edge that flows into the vertex to input parameters of the vertex.

In an example, the implementation manner of the tensor alias technique can be as follows.

$$\text{func}:\{t\} \rightarrow \{t\} \Rightarrow \text{func}:\{t\} \rightarrow \{t'\}$$

Figure 7:
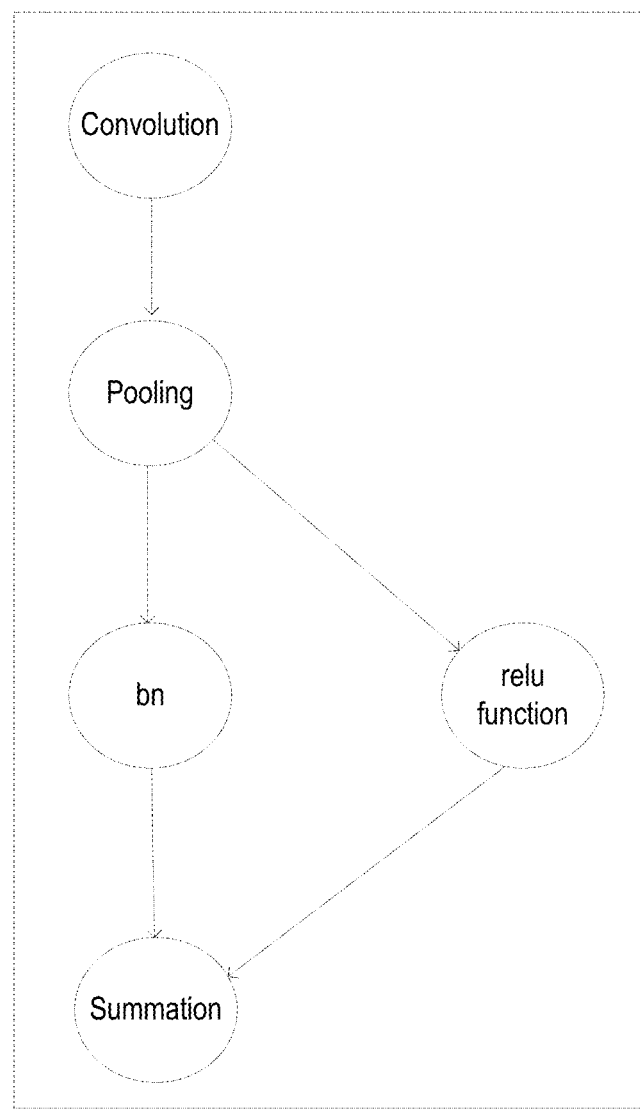
FIG. 7 is a diagram of a computation model according to an embodiment of the present disclosure.

FIG. 7 is a diagram of a computation model according to an embodiment of the present disclosure. As shown in the figure, the computation model can be expressed as two unidirectional operation instruction sequences: (cony, pool, bn, relu, add) and (cony, pool, relu, bn, add). A computation model execution can be completed by calling the operation instructions in the order in which the operation instructions appear in the unidirectional operation instruction sequence. It should be noted that since the relu and add operations are connected from right to left, the computation model above cannot be expressed as an operation instruction sequence (cony, pool, add, bn, relu).

In a possible implementation manner, since deep learning algorithms usually deal with fixed-size data, performance optimization can be achieved by fixing parameters of operation instructions. By default, all parameters of an operation instruction are variable at runtime. In order to use fixed parameters to optimize operation performance, an embodiment of the present disclosure provides a design with functions of parameter binding and operation instruction specialization for the operation instruction. Parameter binding refers to fixing part or all of input parameters of an operation instruction; operation specialization refers to converting a parameter bound operation instruction into a new operation instruction, then the new operation instruction can be called a specialized operation instruction. A specialized operation instruction still meets the definition and nature of operation instruction, and supports all functions of operation instruction (supporting specialization, fusion, etc.). The classification of specialized instructions can be flexibly set according to the actual situation. In a possible implementation manner, the specialized operation instructions can be divided according to the count of parameters bound. In one example, the specialized instructions include fully specialized operation instructions, partial specialized operation instructions, and pseudo-specialized operation instructions.

The fully specialized operation instructions include operation instructions obtained after all input parameters of the operation instructions are bound.

The partial specialized operation instructions include operation instructions obtained after N input parameters of the operation instructions are bound, where N is a positive integer less than the count of input parameters of the operation instructions.

The pseudo-specialized operation instructions include operation instructions that are directly converted without binding input parameters of the operation instructions.

It can be seen from the disclosed embodiments above that in the embodiments of the present disclosure, the specialized operation instructions are divided into three categories: an operation instruction of which all input parameters are bound is a fully specialized operation instruction; an operation instruction of which some input parameters are bound is a partial specialized operation instruction; and an operation instruction of which no input parameter is bound is a pseudo-specialized operation instruction. A bound parameter can be deleted from the input parameters of an operation instruction. The user does not need to specify the bound parameter when calling the operation instruction that has bound parameters. Therefore, the user may not specify any input parameter for a fully specialized operation instruction.

Through parameter binding and specialization of operation instructions, a program can be subject to partial evaluation optimization during compilation, thereby reducing the running time of operation instructions. The specific implementation manner of parameter binding and specialization of operation instruction is not limited. In a possible implementation manner, an nclSpecializeoperation instruction interface can be used to execute a specialized operation instruction. The interface can compile and optimize the operation in real time and return the specialized operation instruction with shorter execution time to the hardware device. In an example, there may be a convolution operation of which the attributes and values of input, output, and a weight of the convolution operation are completely determined. At this time, parameter binding and operation instruction specialization can be used to generate a convolution operation with a faster running speed. Parameter binding and specialization of operation instruction can be widely used in real computation models. In an example, a deep learning computation model usually deals with fixed-size data, so the shape of a tensor can be parameter-bound, and can then be subject to operation instruction specialization to optimize the program performance. In an example, in an inference application scenario, a weight is a constant trained in advance, so the weight data of an operation can be parameter-bound, and can then be subject to operation instruction specialization to obtain a specialized operation instruction, thereby optimizing the program performance.

In a possible implementation manner, the deep learning programming library usually only supports a processing layer that is frequently used and is time-consuming (such as convolution, full connection, RNN, pooling, and activation), resulting in a situation where the programming library cannot support end-to-end execution very well. In order to solve the above-mentioned problems, an embodiment of the present disclosure provides a function of operation customization for operation instructions, so that operation instructions become customizable. Operation customization refers to writing an operation in a domain-specific programming language and then inserting the operation into a programming library in the form of binary code. In an embodiment of the present disclosure, this operation is called a customized operation instruction (customized operator). A customized operation instruction still meets the definition and nature of an operation instruction, and supports all the functions of an operation instruction (supporting specialization, fusion, etc.).

Figure 8:
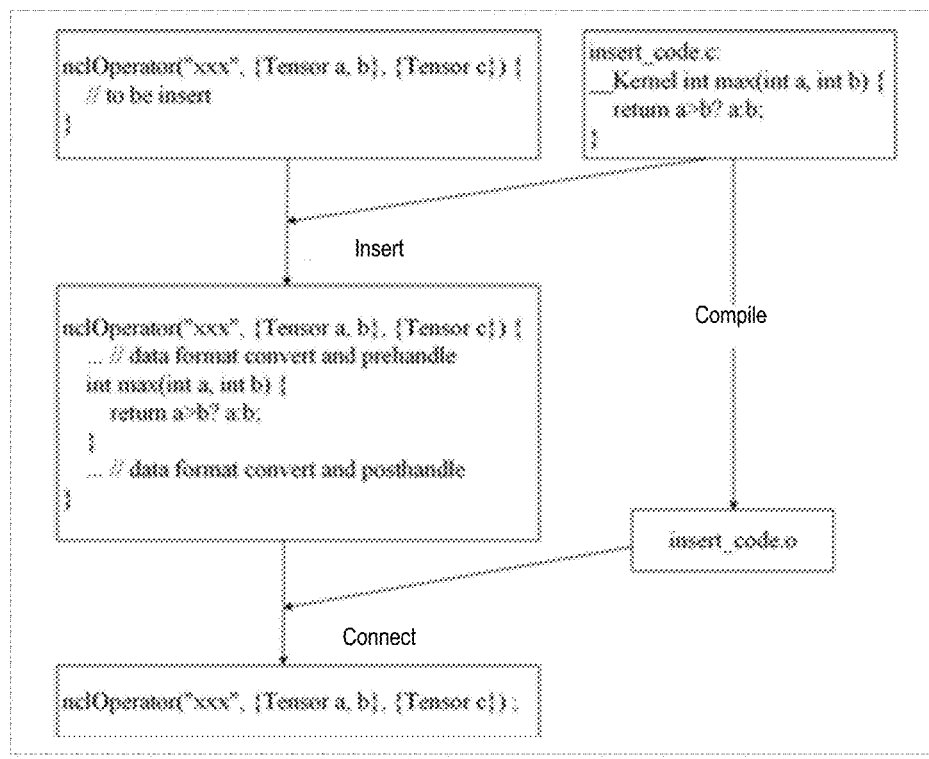
FIG. 8 is a diagram showing a process of generating a customized operation instruction according to an embodiment of the present disclosure.

Since the customized operation instruction is inserted into the programming library in the form of binary code, the customized operation instruction needs to be compiled in advance to generate a binary code. A generation process of the binary code corresponding to the customized operation instruction can be flexibly determined according to the actual conditions of NCLAPI and the deep learning programming library. FIG. 8 is a diagram shows the generating of a customized operation instruction according to an embodiment of the present disclosure. As shown in the figure, in a possible implementation manner, the generation process of the binary code corresponding to the customized operation instruction may include:

according to the interface and data structure definition of an operation instruction, encapsulating a user instruction corresponding to the operation instruction to obtain an encapsulated user instruction;

compiling the encapsulated user instruction to obtain a compiling result; and inserting the compiling result into a static operation pool in a manner of dynamic link or static link to obtain the binary code corresponding to the customized operation instruction.

The static operation pool in the disclosed embodiment above is a storage area in the deep learning programming library. A specific implementation manner of the static operation pool will be described in detail in the subsequent disclosed embodiment.

The process of compiling the encapsulated user instruction to obtain the compiling result, and inserting the compiling result into the static operation pool of the deep learning programming library in the form of a dynamic link or static link to obtain the binary code corresponding to the customized operation instruction, a pre-compiled customized operation instruction can be generated and the compiling result of the customized operation instruction can be stored. In this way, a non-built-in operation instruction that frequently appears can be converted into an encapsulated customized operation instruction, so that when a deep learning algorithm is to be implemented, an operation to be performed can be realized by directly calling the customized operation instruction, thereby avoiding repeated and useless instruction editing. In addition, since the compiling result of the customized operation instruction has been stored in the deep learning programming library, the binary code corresponding to the customized operation instruction can be called directly during compilation without repeated compilation, which may effectively improve the efficiency of compilation and shorten the compilation time.

In an example, according to the generation process of the binary code corresponding to the customized operation instruction proposed in the disclosed embodiment above, a specific process of implementing operation customization may be: implementing customized transformation by using a programming language to obtain a code to be inserted (insert code); according to the interface and data structure definition of an operation instruction, encapsulating the code to be inserted, and finishing data format conversion and other tasks; compiling the code to be inserted, and inserting the code into a deep learning programming library in a form of dynamic link or static link to complete operation customization; and using the customized operation instruction in the same way as an operation instruction. It should be noted that the name of the customized operation instruction is specified by the user, but the name cannot conflict with the operation name of a build-in operation.

In a possible implementation manner, the operation instruction proposed in the embodiments of the present disclosure may also support an operation fusion function. Opertation fusion (operation instruction fusion) refers to combining a plurality of reshapable operations in the calling order into a new reshapable operation. The new operation can be called a fusion operation instruction (fusion operator). The fusion operation instruction still satisfies the definition and nature of the operation instruction, and supports all the functions of the operation instruction (supporting specialization, fusion, etc.). In an example, a formal expression of operation instruction fusion is as follows:

$$op_{fused}=\text{Fuse}(op_1, op_2, \ldots, op_n)$$

In an embodiment of the present disclosure, operation instruction fusion has the nature of week transformation equivalence: a computation result of a fusion operation instruction and a computation result of an original operation instruction sequence can be regarded as equal within an allowable error range, which is formally expressed as error <epsilon, where epsilon is determined according to the sensitivity of the application process to precision. In an example, the fusion operation instruction can be subject to operation fusion again, which is called high-order fusion. The output obtained by high-order fusion is still a reshapable operation, which is expressed as follows:

$$op_{fused2}=\text{Fuse}(op_1, op_2, \ldots, op_{fused}, \ldots, op_n)$$

Operation fusion can bring two benefits: optimized performance and simplified programming. In terms of performance optimization, the programming library can perform compilation optimization at a computational graph level within a fusion operation (for example, linear transformation, constant folding, and other optimization techniques can be used to reduce the overall amount of computations and memory access), thereby reducing the execution time of the operation on the device. In terms of programming simplification, a single fusion operation instruction can be used to represent a commonly used function block in a deep learning algorithm (such as a residual block in ResNet) or even an entire computation model. These highly abstract components can be used repeatedly to improve the efficiency of program development.

Figure 9:
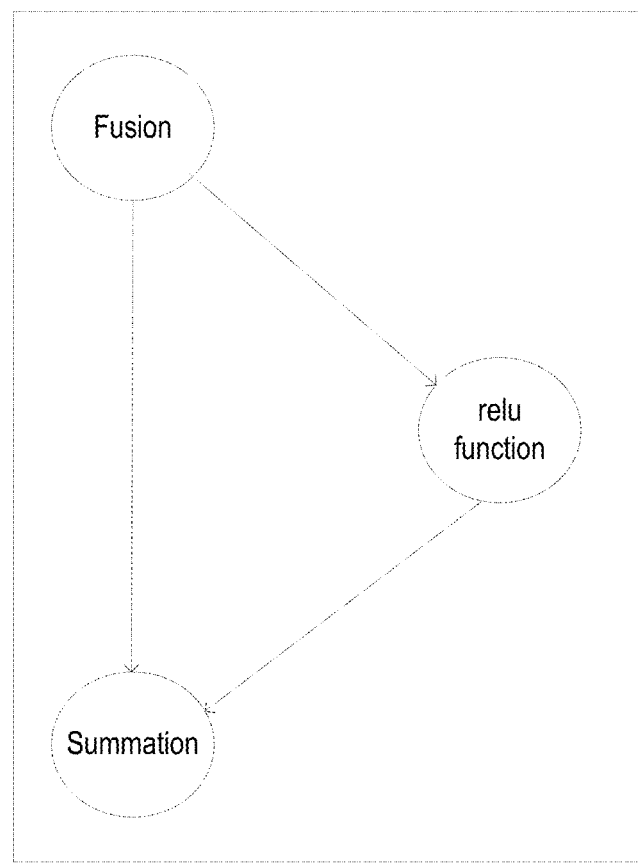
FIG. 9 is a diagram of a result of operation fusion according to an embodiment of the present disclosure.
Figure 10:
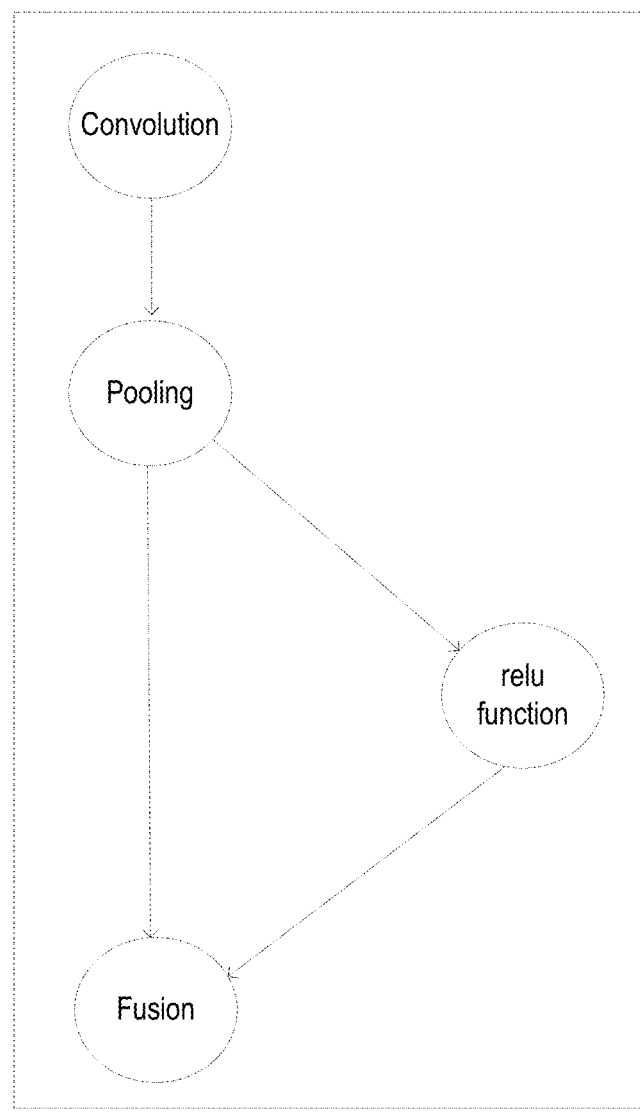
FIG. 10 is a diagram of a result of operation fusion according to an embodiment of the present disclosure.

In a possible implementation manner, operation fusion needs to meet certain conditions. In an example, the condition may be: an operation instruction to be fused may be expressed as continuous sub-sequences in a unidirectional operation instruction sequence. As shown in the schematic diagram of a computation model shown in FIG. 7, the disclosed embodiment above has proposed that in an example, the computation model can be expressed as the following two unidirectional operation instruction sequences, which are seq1: (cony, pool, bn, relu, add) and seq2: (cony, pool, relu, bn, add). Any sub-sequence in these two operation instruction sequences can be subject to operation fusion. FIG. 9 shows a schematic diagram of an operation fusion result according to an embodiment of the present disclosure. As shown in the figure, in an example, cony, pool, and bn in seq1 can be fused to obtain a computation model (fusion, relu, add). FIG. 10 shows a schematic diagram of an operation fusion result according to an embodiment of the present disclosure. As shown in the figure, in an example, the two operation instructions bn and add of seq2 can be fused to obtain a computation model (cony, pool, relu, fusion). In one example, the three operation instructions pool, relu, and add cannot be fused because they are neither continuous sub-sequences of seq1 nor that of seq2. If they are forcibly fused into a fusion operation, cyclic data dependency may occur no matter how fusion is inserted into the sequence (cony, bn). In other words, bn depends on an output result of fusion, and fusion also depends on an output result of bn, so operation fusion cannot be performed at this time.

According to the above-mentioned operation fusion principle, in a possible implementation manner, a creation process of a fusion operation instruction may include:
- creating the name of a fusion operation instruction;
- determining fusion sub-operation instructions according to operation instructions to be fused;
- determining an operation connection relationship between the fusion sub-operation instructions according to a calling sequence of the operation instructions to be fused;
- connecting the fusion sub-operation instructions according to the operation connection relationship to obtain a connection result;
- setting input parameters and output parameters of the fusion sub-operation instructions according to a user instruction corresponding to the fusion sub-operation instructions; and
- packing the name, the connection result, the input parameters, and the output parameters to obtain the fusion operation instruction.

Through the above-mentioned creation process of fusion operation instruction, a plurality of operation instructions can be fused into one fusion operation instruction more conveniently, thereby effectively optimizing compilation performance and reducing the execution time of operation instruction on the device. At the same time, a single fusion operation instruction can be used to express commonly used function blocks and even an entire computation model in deep learning algorithms, thereby improving the efficiency of program development.

Figure 12:
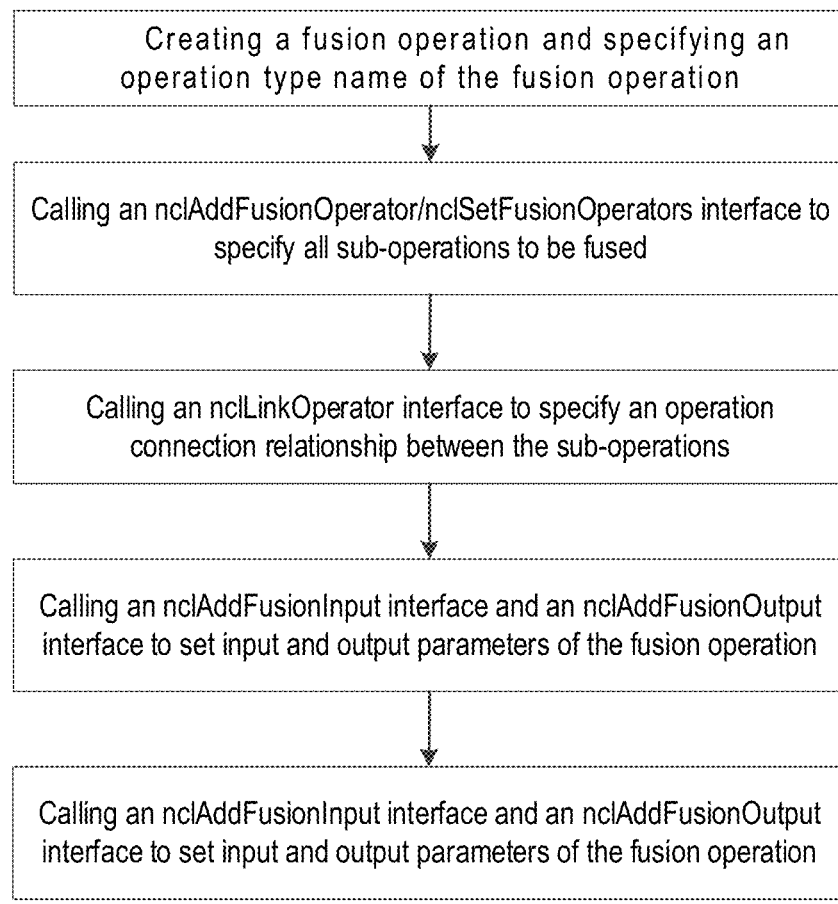
FIG. 12 is a diagram of a process of creating a fusion operation according to an embodiment of the present disclosure.

A specific programming interface of operation fusion can be flexibly set according to the actual situation. FIG. 11 is a diagram of a related programming interface for operation fusion according to an embodiment of the present disclosure. In an example, based on a programming interface shown in the figure and the above-mentioned process of creating a fusion operation instruction, a process of creating a fusion operation can be obtained. FIG. 12 is a schematic diagram of the process of creating a fusion operation according to an embodiment of the present disclosure. As shown in the figure, in an example, the steps of creating a fusion operation may include:
- creating a fusion operation and specifying an operation type name of the fusion operation (must not conflict with a build-in operation type);
- calling an nclAddFusionoperation instruction/nclSetFusionoperation instructions interface to specify all sub-operations to be fused;
- calling a nclLinkoperation instruction interface to specify an operation connection relationship between the sub-operations;
- calling an nclAddFusionInput interface and an nclAddFusionOutput interface to set input and output parameters of the fusion operation; and
- calling a nclFuseoperation instruction interface to complete operation fusion.

In the steps above, a purpose of function connection for sub-operations is to construct a computational graph level. A nclFuseoperation instruction interface will compile and optimize the computational graph in time to speed up the execution of the operation.

It can be seen from the disclosed embodiments above that the operation instruction proposed in the embodiments of the present disclosure may include an operation fusion instruction, or other types of operation instructions such as a build-in operation instruction, a specialization operation instruction, etc. Different types of operation instructions may implement different programming models. In the embodiments of the present disclosure, NCLAPI adopts a mixed programming model, that is, the model supports both imperative programming and declarative programming. In a possible implementation manner, a hybrid programming model can be designed based on operation fusion, that is, a programming model that does not use a fusion operation is an imperative programming model, and a programming model that uses a fusion operation is a declarative programming model. The two programming models can be used in combination.

The implementation manner of a programming model can be flexibly set according to the actual situation. In a possible implementation manner, a programming model can be designed based on three factors, which are: data flow, execution flow, and control flow. In terms of the data flow, in order to complete data transfer between a host and a device, an embodiment of the present disclosure designs a data copy interface nclMemcpy for NCLAPI. In terms of the control flow, in order to control the execution of a device and to perform synchronization between a host and the device, an embodiment of the present disclosure designs an operation calling interface nclInvokeoperation instruction and a device synchronization interface nclSyncDevice for NCLAPI. In terms of the execution flow, an embodiment of the present disclosure divides the execution mode of a computational model into three categories, which are: calling layer by layer: calling all operations in a computational model one by one; fusion and calling: performing operation fusion on an entire computational model, and then calling a fusion operation; and fusing and calling by segment: performing operation fusion on a computational model by segment, and then calling a fusion operation by segment. An NCLAPI programming model is distinguished according to the following three types of execution methods: the execution method of layer-by-layer calling corresponds to an imperative programming model; the execution method of fusion calling corresponds to a declarative programming model; the execution method of fusing and calling by segment corresponds to a mixed programming model. The above disclosed embodiment has proposed that in a possible implementation manner, the operation data is created or called according to the user instruction received by the deep learning programming library interface. In an example, based on the execution mode of the three computational models provided by the embodiment, it can be seen that triggering and calling the operation instruction in the deep learning programming library interface according to the user instruction may include: according to the user instruction, calling all corresponding operation instructions one by one; or, according to the user instruction, fusing all corresponding operation instructions to obtain a fusion operation instruction, and calling the fusion operation instruction; or, according to the user instruction, dividing all corresponding operation instructions into segments to obtain segmentation results, fusing each segmentation result separately to obtain a corresponding segmented fusion operation instruction, and calling the segmented fusion operation instructions in turn.

In a possible implementation manner, these three calling methods can be used to distinguish an NCLAPI programming model. The execution method of layer-by-layer calling may correspond to an imperative programming model; the execution method of fusion calling may correspond to a declarative programming model; the execution mode of fusing and calling by segment may correspond to a mixed programming model.

Figure 13:
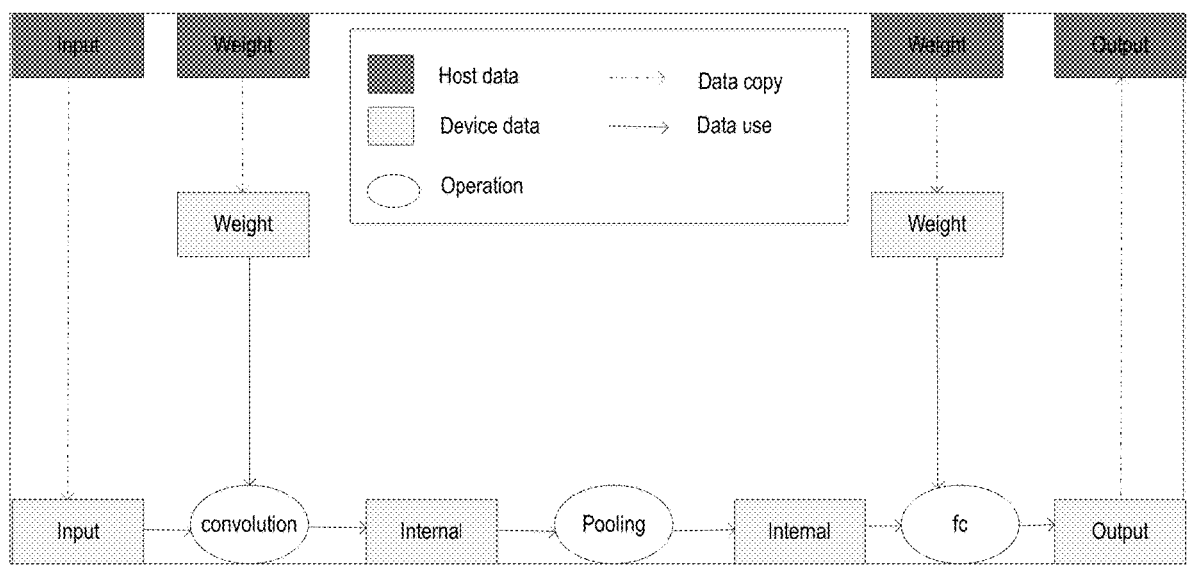
FIG. 13 is a diagram of a data flow of a three-layer computation model according to an embodiment of the present disclosure.

FIG. 13 shows a schematic diagram of the data flow of a three-layer computational model according to an embodiment of the present disclosure. As shown in the figure, in an example, based on a programming model in the figure, a process of calling operation instructions by using different calling methods may be: calling layer by layer: calling the nclInvokeoperation instruction interface three times to perform cony, pool, and fc operations respectively; fusing and calling: first fusing cony, pool, and fc operations into a single operation, and then calling the nclInvokeoperation instruction interface once to perform a fusion operation; fusing and calling by segment: fusing cony and pool operations, and then calling the nclInvokeoperation instruction interface twice to perform a fusion operation and the fc operation respectively.

Figure 14:
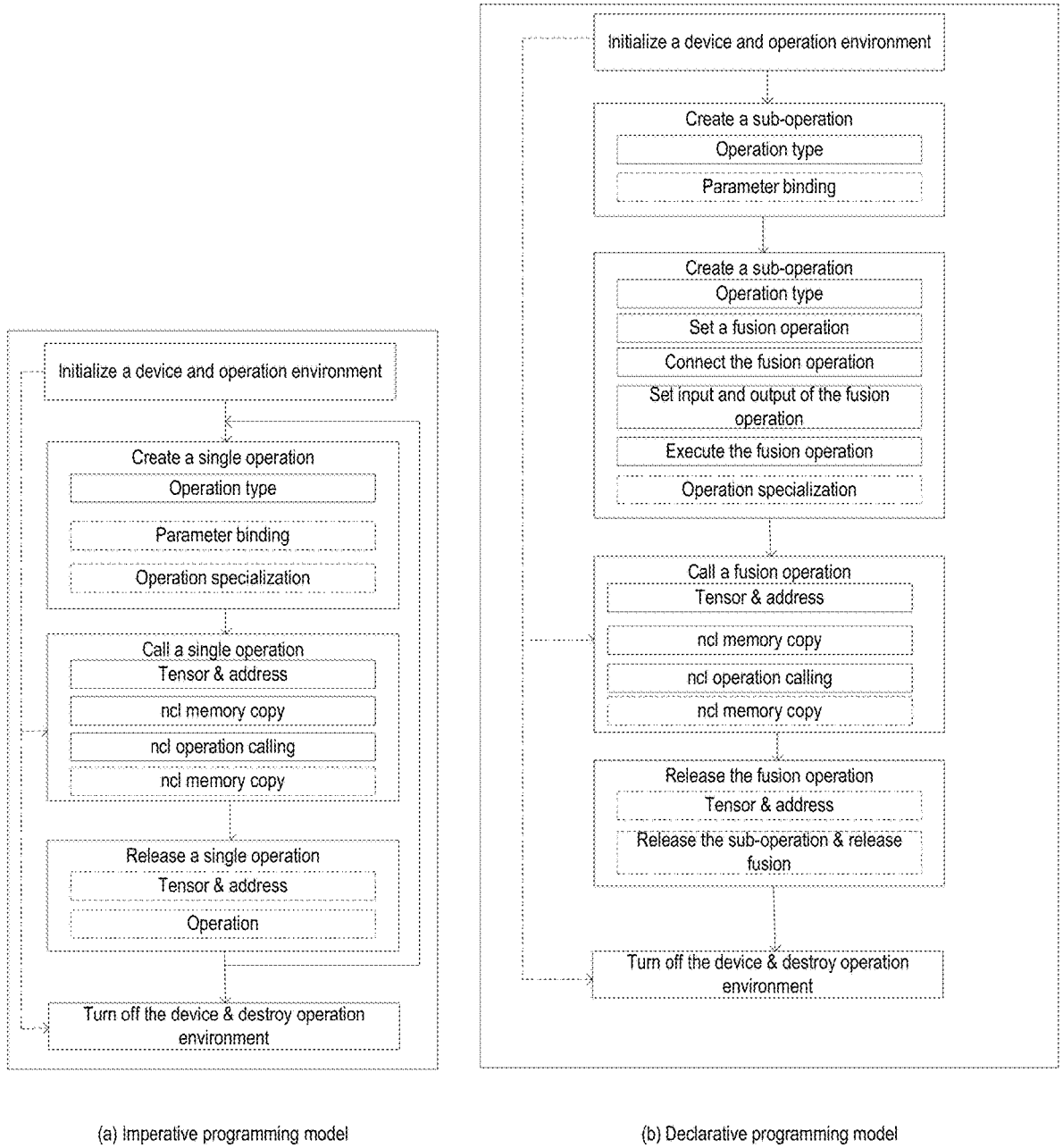
FIG. 14 is a block diagram of an implementation of a mixed programming model according to an embodiment of the present disclosure.

FIG. 14 is a block diagram of an implementation of a mixed programming model according to an embodiment of the present disclosure. As shown in the figure, in an example, the mixed programming model is composed of an imperative programming model and a declarative programming model. An example below provides a complete programming process of an imperative programming model. Initialization: initializing a device and operating environment; operation creation: creating a single operation, selectively binding parameters and specializing the operation; operation calling: preparing operation parameters (including creating a tensor and allocating a device address), copying host-side input data to a device memory, calling the operation, and synchronizing the device, and reading an output result from the device memory; operation resources release: destroying resources that are no longer used in the first two steps, including tensor, operation, memory, etc.; repeating the creation, calling, and releasing operations until all operations in a computational model are completed; exit: turning off the device and destroying the operating environment. An example below provides a complete programming process of a declarative programming model. Initialization: initializing a device and operating environment; sub-operation creation: creating all sub-operations that need to participate in fusion, and selectively binding parameters of the sub-operations; fusion operation creation: creating a fusion operation, adding the sub-operations to be fused, specifying an operation connection relationship between the sub-operations, setting input and output parameters of the fusion operation, fusing the operations, and selectively specializing the operations; fusion operation calling: preparing operation parameters (including creating a tensor and allocating a device address), copying host-side input data to a device memory, calling the operations, synchronizing the device, reading output results from the device memory; operation resource release: releasing sub-operation resources, releasing fusion operation resources; exit: turning off the device and destroy the operating environment.

The disclosed embodiment above has proposed that a specialized operation instruction and a fusion operation instruction can optimize compilation performance. However, in a possible implementation manner, the compilation of these two operation instructions needs to be implemented by just-in-time compilation, which may lead to an increase in the run time of the host side and an increase in the total run time of the program. Therefore, in a possible implementation manner, an offline mode can be used for further optimization, which helps to store compilation time and improve compilation efficiency.

Figure 15:
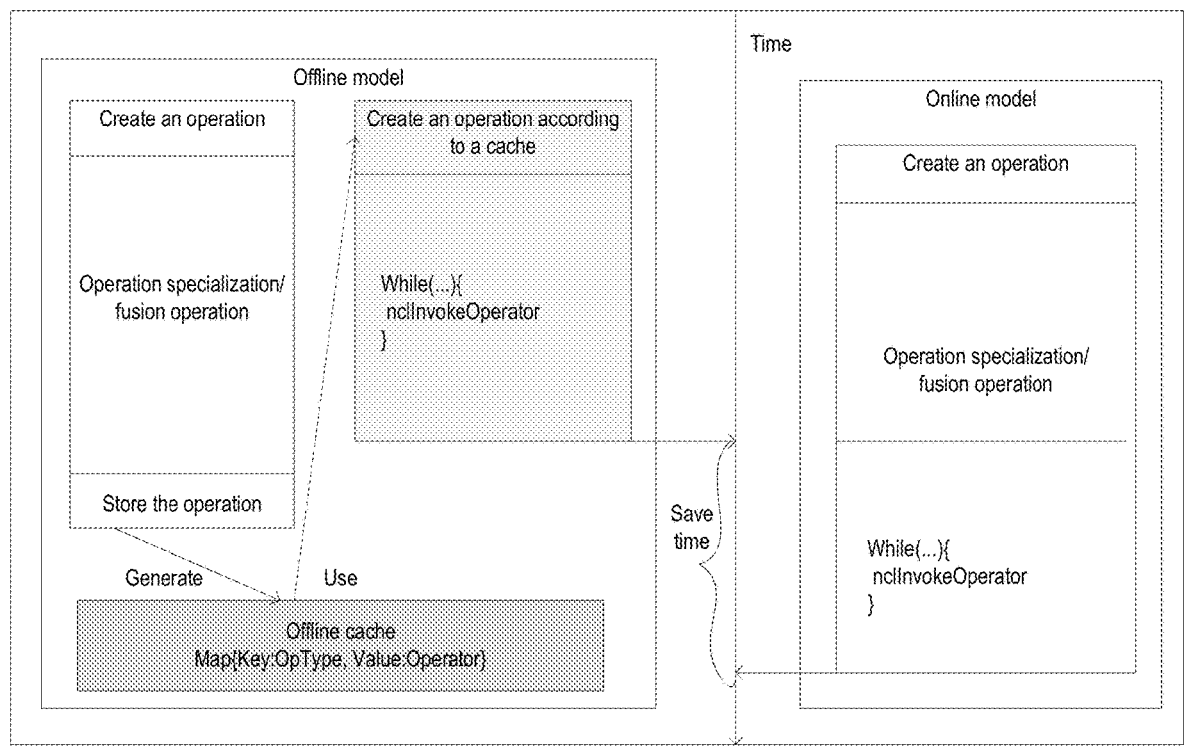
FIG. 15 is a diagram showing the difference between an offline mode and an online mode according to an embodiment of the present disclosure.

Since deep learning algorithms are highly reusable, an optimized computation model can be used repeatedly for inference. Therefore, for a same computational model, once a specialized operation instruction or a fusion operation instruction is created, the operation instruction can be called repeatedly. The more an operation instruction is called, the higher the benefits that a specialization operation or operation fusion may bring. Therefore, in a possible implementation manner, an embodiment of the present disclosure proposes an offline mode for NCLAPI to eliminate secondary compilation overhead caused by operation specialization and operation fusion on a host side. The implementation manner of the offline mode can be flexibly set according to the actual situation. In an example, operation specialization or operation fusion can be used in a separate program to optimize an operation instruction in advance, and then the optimized operation instruction can be used directly in another program. In a possible implementation manner, an operation instruction that is optimized in advance is called an offline operation instruction. Besides the offline mode, the present disclosure also provides an online mode. FIG. 15 is a schematic diagram of the difference between the offline mode and the online mode according to an embodiment of the present disclosure. As shown in the figure, in an example, the online mode may be that, in a same program, operation specialization or operation fusion is performed first, and then the specialized operation instruction or the fusion operation instruction is called.

It can be seen from the disclosed embodiment above that in a possible implementation manner, an offline operation instruction and a binary code obtained from compiling need to be stored in advance to facilitate subsequent direct use. Therefore, an embodiment of the present disclosure further provides an offline cache for NCLAPI. The implementation manner of the offline cache can be flexibly determined according to the actual situation. In a possible implementation manner, the offline cache includes an offline file and an index table. The offline file is used to store a pre-compiled result of an offline operation instruction. The index table is used to indicate a location where the pre-compiled result of the offline operation instruction is stored in the offline file. A specific implementation manner of the offline file and the index table can also be flexibly selected according to the actual situation. In an example, the offline operation is stored in the offline file, and the location of the operation in the offline file is indicated by the index table. The index table is implemented using a key-value pair (Key, Value). Key denotes the name of the offline operation, and Value is a pointer that points to the binary code corresponding to the offline operation in the offline file. A specific interface of the offline operation instruction can be set according to the actual situation. FIG. 16 is a diagram of an offline interface according to an embodiment of the present disclosure. As shown in the figure, in an example, an implementation manner of an interface of the offline operation instruction may be: nclstoreoperation instruction. The interface stores the specified operation instruction to the offline cache, and uses the string specified by op_type as the name and index key of the operation. The use of offline operation instructions is exactly the same as the build-in operation instructions, except that the operation types are different. Therefore, users can still use the nclCreateoperation instruction interface to create an offline operation instruction. NCLAPI will first match a build-in operation instruction to a given operation name. If the matching fails, NCLAPI will then find out whether there is a corresponding offline operation instruction in the offline cache.

It can be seen from the disclosed embodiment above that NCLAPI can transfer operation data and has good adaptability to deep learning algorithms. Therefore, in a possible implementation manner, NCLAPI can be integrated into a deep learning framework. In a possible implementation manner, the class of a deep learning framework can be extended. Tensor data and an operation instruction are encapsulated in data of the deep learning framework to integrate the deep learning framework and the deep learning programming library interface. In an application, as the implementation manner of the deep learning framework differs, the way of integrating NCLAPI into the deep learning framework may also change accordingly.

In an example, the deep learning framework can be Caffe. Caffe contains three key data structures: Blob, Layer, and Net. Blob is mainly used to store data, complete data copy between a host and a device, and provide a data access interface. Layer is used to represent operations (such as convolution, pooling, etc.). Layer uses Blob as input and output. Caffe has designed an inheritance system for Layer. Different operations can be implemented by writing a sub-class of Layer. Layer has three key methods: Setup, Forward, and Backward, which are responsible for operation initialization, forward computation, and back computation, respectively. In order to support different devices, the same sub-class of Layer can contain a plurality of Forward and Backward methods.

Net stores all Blobs and Layers. It uses a directed acyclic graph composed of Layers to express a complete computational model. Net has three key methods: Init, Forward, and Backward. The Init method is to convert the computational model defined by NetParameter (converted from prototxt) into Blob and Layer, and to call the Setup method to initialize all Layers. The Forward method is to perform forward inference on the entire computational model. The Backward method is to perform back training on the computational model. Caffe uses prototxt to model the deep learning computational model. The user describes processing layers, data, and the connection relationship of the processing layers according to the syntax of prototxt. Caffe receives the prototxt file, converts the file into Blob, Layer, and Net then executes it.

According to the composition of Caffe, in an example, an embodiment of the present disclosure integrates NCLAPI into Caffe in the following manner:
expanding the Blob class, which may be encapsulating the nclTensor data structure and related interfaces (such as nclCreateTensor, nclSetTensorAttr, nclMemcpy) into Blob;
extending the Layer class, which may be encapsulating the ncloperation instruction data structure and related interfaces of NCLAPI into Layer, specifically, encapsulating nclCreateoperation instruction, nclSpecializeoperation instruction, nclBlindOutputTensor and other interfaces into the Setup method of Layer, and encapsulating nclInvokeoperation instruction into the Forward method and the Backward method of Layer. In order to support new devices and operators without damaging the existing Layer, an embodiment of the present disclosure adopts an implementation method of adding a sub-class to Layer.

Expanding the Net class can be encapsulating the operation fusion interface of NCLAPI into Net. Since all Layers can be obtained in Net, Net is a most suitable carrier for operation fusion. An embodiment of the present disclosure adds an operation fusion module to Net so that a computational model can be fused by segment or completely fused.

Figure 17:
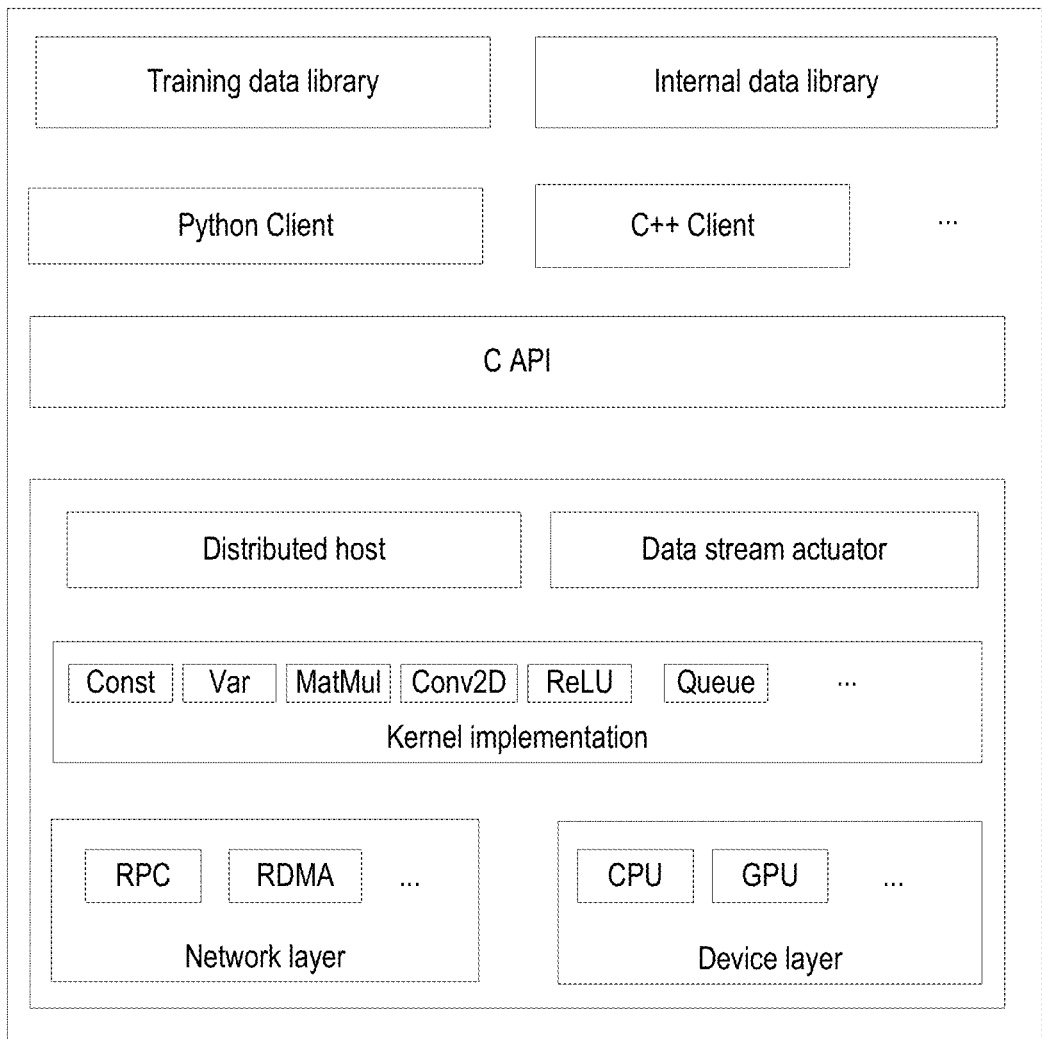
FIG. 17 is a TensorFlow architecture diagram according to an embodiment of the present disclosure.

In an example, the deep learning framework may be TensorFlow. FIG. 17 is a TensorFlow architecture diagram according to an embodiment of the present disclosure. As shown in the figure, in an example, TensorFlow is designed with good architecture extensibility. It reserves the operator addition and device registration mechanism, and is provided with detailed official documentation, therefore, third-party deep learning programming libraries and deep learning processors are relatively easy to be integrated into TensorFlow. Since the distributed master of TensorFlow is responsible for the division and task allocation of a computation sub-graphs, in one example, the operation fusion of NCLAPI can be integrated into the distributed master module to perform operation fusion on the sub-graphs.

In an example, an embodiment of the present disclosure integrates NCLAPI into TensorFlow in the following manner:
expanding the Tensor class, which may be encapsulating the nclTensor data structure and related interfaces (such as nclCreateTensor, nclSetTensorAttr, nclMemcpy) into Tensor;
registering a new device (deep learning processor) and an NCLAPI operator according to the official TensorFlow documentation; and
integrating the operation fusion function into the distributed master module.

It can be seen from the disclosed embodiment above that NCLAPI uses tensors to represent multi-dimensional data such as scalars, vectors, and matrices, and uses operation instructions to represent deep learning processing layers. The operation instructions support operation fusion, operation customization, operation specialization, variable operation parameters at runtime, offline optimization, and mixed programming model (imperative+declarative), so that the performance can be optimized and the programming flexibility can be improved. In an example, NCLAPI can be deployed on the DaDianNao deep learning processor platform, and NCLAPI can also be integrated into mainstream deep learning frameworks such as Caffe and TensorFlow. Practice has proved that NCLAPI has strong versatility and flexibility, and can run mainstream deep learning algorithms including image classification, target detection, and natural language processing. In addition, NCLAPI simulates the neurological calculus in the design of data structures and interfaces, thus proving that the neurological calculus can be used as a theoretical basis to guide the design of deep learning programming libraries.

FIG. 18 is a diagram of comparison between NCLAPI and mainstream deep learning programming library interfaces according to an embodiment of the present disclosure. It can be seen from the figure that compared with the mainstream deep learning programming library interfaces, NCLAPI supports a mixed programming model and can satisfy the needs of performance optimization and programming flexibility at the same time. NCLAPI supports operation customization, has strong operation scalability, and can better support end-to-end execution performance optimization. NCLAPI also supports operation fusion, operation specialization, and the offline mode, which can optimize the performance of a program from various aspects. At the same time, Tensorflow integrated with NCLAPI can provided end-to-end support (without using any CPU operation) for a large number of deep learning computations models.

Figure 19:
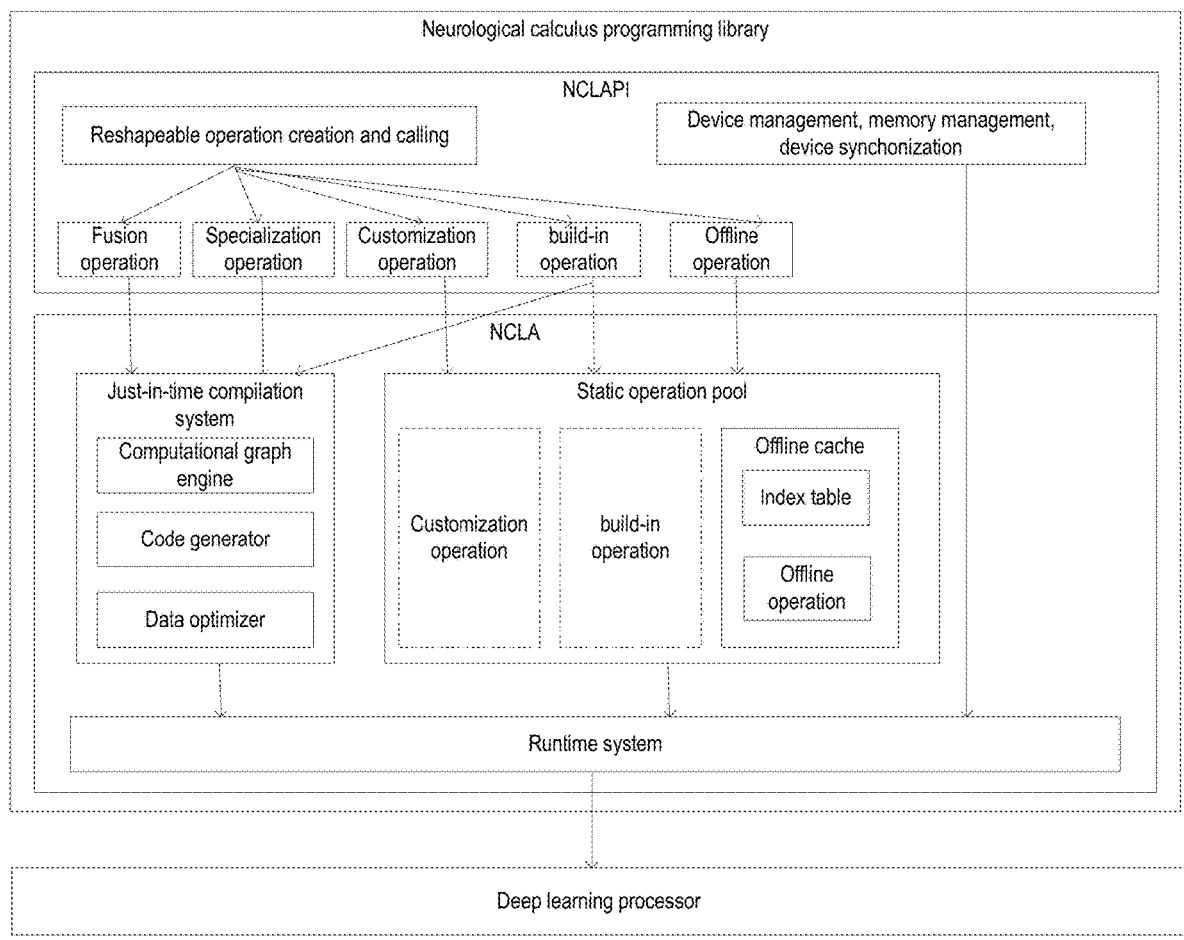
FIG. 19 is a diagram of an NCLA overall architecture according to an embodiment of the present disclosure.

According to the disclosed embodiments above, it can be seen that the deep learning algorithm compiling method provided by the embodiments of the present disclosure can be implemented based on the NCLAPI interface in a possible implementation manner. After receiving the operation data transferred by NCLAPI, the instruction type can be determined according to the operation instruction included in the operation data, and the compilation operation corresponding to the instruction type can be executed according to the determination result to obtain the binary code of the deep learning algorithm. Therefore, based on this compiling method, an embodiment of the present disclosure also provides a neurological calculus library architecture (NCLA), which is a deep learning programming library architecture that is adapted to the compiling method. FIG. 19 is a diagram of an NCLA overall architecture according to an embodiment of the present disclosure. As shown in the figure, in a possible implementation manner, NCLA can be implemented by a just-in-time compilation system (NCLCS), a static operation pool (NCLSOPP) and a runtime system (NCLRT). NCLA can be integrated with NCLAPI, and can perform compilation according to operation data transferred by NCLAPI. The just-in-time compilation system can perform computation and data unified compilation optimization on any operation instruction at runtime to generate an efficient binary code. The static operation pool can be used to store the optimized binary code, thereby eliminating the overhead of secondary compilation. The runtime system can provide basic functions such as device management, memory management, operation execution, and device synchronization, so that operation instructions can be deployed to the deep learning processor for execution in an end-to-end manner.

It has been proposed in the disclosed embodiments above that program optimization in the field of deep learning is extremely sensitive to changes in algorithms and hardware. Therefore, in the implementation process, it is difficult to meet the performance requirements of different algorithms and different hardware platforms through ahead-of-time compilation (AOT) optimization. Therefore, in a possible implementation manner, an embodiment of the present disclosure may adopt a just-in-time compilation optimization (JIT) to design NCLA. Just-in-time compilation and optimization can dynamically adjust optimization strategies for different algorithms and different hardware platforms at runtime to achieve universal performance optimization. However, just-in-time compilation causes additional runtime overhead. A common method to alleviate this problem is to introduce a just-in-time compilation cache. Since deep learning algorithms are highly reusable, cache can be of great use. In a possible implementation manner, the static operation pool provided in the embodiment of the present disclosure serves as a cache for the just-in-time compilation system. Since coupling between operation and data is very high, the performance of the deep learning processor cannot be fully exploited merely by optimizing operation or data alone. Therefore, in a possible implementation manner, a compilation framework for unified operation and data optimization can be used in the design of just-in-time compilation.

Based on the principles above, the operation instruction contained in operation data that is transferred by NCLAPI can be shunted. A specific shunting method can be flexibly selected according to the actual situation. In a possible implementation manner, operation instructions can be divided into two types: static operation instruction and dynamic operation instruction. A dynamic operation instruction can trigger NCLA to perform just-in-time compilation, and a static operation instruction can trigger NCLA to perform a search operation. Instructions included the static operation instruction and the dynamic operation instruction can be determined according to the actual situation of the operation instructions transferred by the deep programming interface, which is not limited to the following embodiments.

In a possible implementation manner, the static operation instruction may include one or more of a customized operation instruction, a build-in operation instruction, and an offline operation instruction.

The customized operation instruction includes an operation instruction that has a customized function and that is implemented according to an encoding method and an encapsulation form of the operation instruction.

The build-in operation instruction includes an own operation instruction that is included in the deep learning programming library interface.

The offline operation instruction includes a pre-compiled dynamic operation instruction, where the pre-compiled result is stored in the offline cache.

The specific implementation manner of the customized operation instruction, the build-in operation instruction, and the offline operation instruction has been described in the above-mentioned disclosed embodiments, and will not be repeated here.

In a possible implementation manner, the dynamic operation instruction may include a specialized operation instruction and/or a fusion operation instruction.

The specialized operation instruction includes an operation instruction obtained by converting an operation instruction of which input parameters are bound.

The fusion operation instruction includes an operation instruction obtained by combining a plurality of operation instructions according to a calling sequence.

The specific implementation process of the specialized operation instruction and the fusion operation instruction has also been described in the disclosed embodiments above, and will not be repeated here.

Therefore, in a possible implementation manner, the step S13 may include:
  step S131, determining an instruction type of an operation instruction; and
  step S132, when the instruction type is the static operation instruction, searching for a corresponding binary code in the static operation pool according to the name of the static operation instruction, and using the binary code as the binary code of the deep learning algorithm.

Based on the principles proposed in the disclosed embodiments above, it can be seen that when the instruction type is the static operation instruction, by searching for a corresponding binary code in the static operation pool according to the name of the static operation instruction and using the binary code as the binary code of the deep learning algorithm, the corresponding binary code of an operation instruction with reusability can be found directly, thereby avoiding multiple and repeated compilations, eliminating secondary compilation overhead, and improving compilation efficiency.

Further, in a possible implementation manner, step S132 may include:
  according to the name of the static operation instruction, searching for a binary code corresponding to the name in the static operation pool; and
  when the search result is success, returning the binary code as the binary code of the deep learning algorithm.

In a possible implementation manner, the step S132 may also include:
  when the search result is fail, using the static operation instruction as a dynamic operation instruction and performing just-in-time compilation.

The disclosed embodiments above have proposed that, in a possible implementation manner, a customized operation instruction can be written by the user using the deep learning programming language. First, a customized operation instruction can be compiled in advance to generate a binary code, and then the binary code is inserted into the static operation pool in the form of a dynamic link or static link. The binary code of an offline operation instruction can be generated by the just-in-time compilation system, and the user can insert the binary code into the static operation pool by calling the nclstoreoperation instruction interface. The build-in operation instruction is an own operation instruction of NCLAPI. Considering that program optimization in the field of deep learning is extremely sensitive to algorithms and hardware, in order to reduce development costs, the embodiments of the present disclosure do not use manual optimization to implement the build-in operation. Instead, the embodiments of the present disclosure use the just-in-time compilation system to pseudo-specialize (specialize without binding any input parameter) an operation instruction to generate the binary code corresponding to the build-in operation instruction, and then insert the binary code into the static operation pool.

It can be seen from the above disclosed embodiments that the static operation pool can be used to store the binary code corresponding to static operation instruction. A specific implementation manner of the static operation pool can be flexibly set according to the actual condition, and is not limited to the following disclosed embodiments. In a possible implementation manner, the static operation pool may include a static operation source file. The static operation source file includes a static code segment, a static data segment, a dynamic code segment, and a dynamic data segment. The static code segment is used to store the binary code corresponding to the build-in operation instruction. The dynamic code segment is used to store the binary code corresponding to the customized operation instruction. The static data segment is used to store tensor data corresponding to the build-in operation instruction. The dynamic data segment is used to store tensor data corresponding to the customized operation instruction.

It is also proposed in the disclosed embodiments above that the binary code corresponding to the offline operation instruction may be kept in the offline cache. Therefore, in a possible implementation manner, the static operation pool may also include the offline cache.

Figure 20:
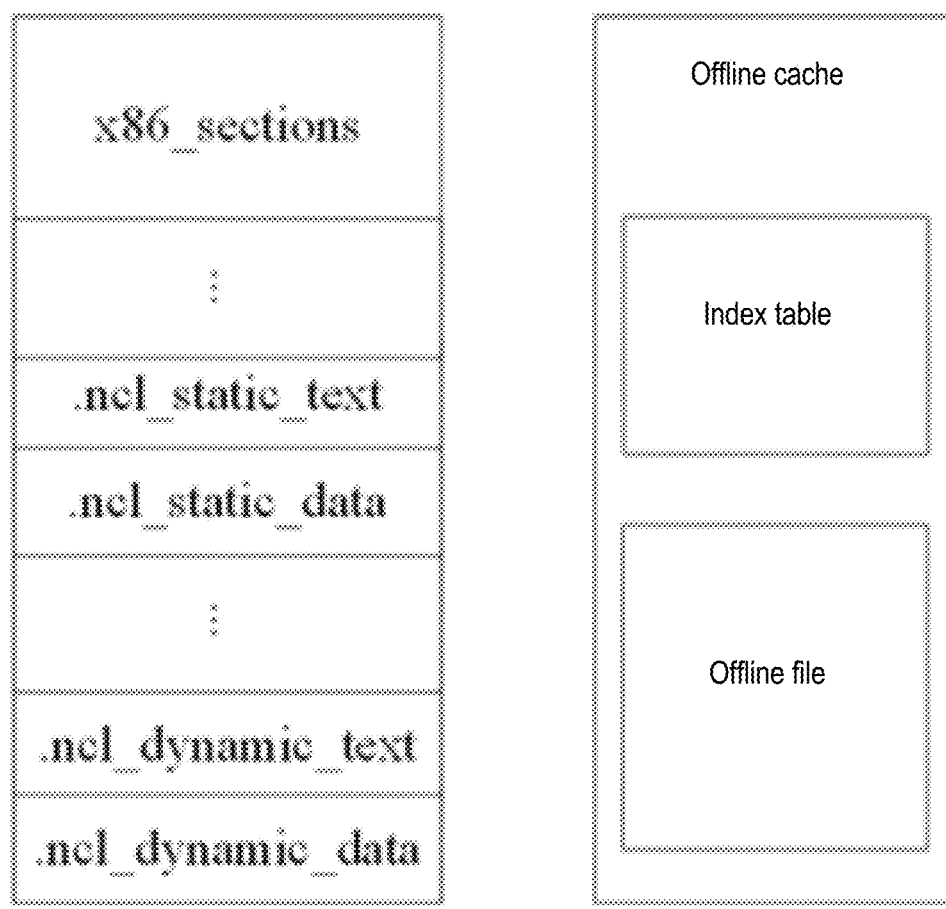
FIG. 20 is a diagram of an implementation manner of a static operation pool according to an embodiment of the present disclosure.

Based on the disclosed embodiment above, FIG. 20 is a diagram of an implementation manner of a static operation pool according to an embodiment of the present disclosure. As shown in the figure, in an example, 4 types of segments can be added to a source file (.so) of the deep learning programming library: static code segment, static data segment, dynamic code segment, and dynamic data segment. The static code segment and the static data segment are used to store the binary code and constant data corresponding to the build-in operation instruction. The dynamic code segment and the dynamic data segment are used to store the binary code and constant data corresponding to the customized operation instruction. A reason for differentiate between the dynamic segment and the static segment is as follows: the customized operation instruction is written by the user and may continue to expand, therefore, the embodiment of the present disclosure proposes the dynamic segment with a variable size for the instruction; and the build-in operation instruction is provided by the deep learning programming library and will not change, therefore, the embodiment of the present disclosure proposes the static section with a fixed size. In addition, the embodiment of the present disclosure does not embed the binary code corresponding to the offline operation instruction into the source file (.so) of the deep learning programming library. Since the offline operation instruction is usually a heavyweight computational model (AlexNet, ResNet) and occupies huge storage space, an embodiment of the present disclosure proposes an offline cache for the offline operation, and uses a file system to store the offline operation instruction. The offline cache is composed of an index table and an offline file. The index table is implemented using a key-value pair (Key, Value). Key denotes a type name of the offline operation instruction. Value is a binary code reference pointer corresponding to the offline operation instruction.

Based on the implementation manner of the static operation pool proposed in the disclosed embodiment above, in a possible implementation manner, the step that according to the name of the static operation instruction, searching for the binary code corresponding to the name in the static operation pool may include:

according to the name specified when the static operation instruction is created, in the static operation pool, sequentially searching for a binary code corresponding to the customized operation, a binary code corresponding to the build-in operation, and a binary code corresponding to the offline operation, so as to obtain the binary code corresponding to the name.

In an example, the user can specify the name of the operation when calling the operation creation interface (nclCreateOperator). NCLA uses the name of the operation as an index to find the corresponding binary code in the static operation pool. The order of search is customized operation instruction, build-in operation instruction, offline operation instruction. If the search hits, the corresponding binary code reference is returned, otherwise, just-in-time compilation is triggered.

The disclosed embodiment above clarifies the specific compiling method when the operation instruction is a static operation instruction. From the disclosed embodiment above, it can also be known that the operation instruction can also be a dynamic operation instruction, which can trigger NCLA to execute just-in-time compilation. In a possible implementation manner, step S13 may further include step S133: when the instruction type is a dynamic operation instruction, performing just-in-time compilation on the dynamic operation instruction to obtain a real-time compilation result as the binary code of the deep learning algorithm.

Through the above process, it can be seen that if the operation instruction transferred by NCLAPI is a dynamic operation instructions such as a fusion operation instruction or a specialization operation instruction, just-in-time compilation (also called real-time compilation) will be triggered when the operation fusion or operation specialization interface (nclFuseoperation instruction, nclSpecializeOperator) is called. The just-in-time compilation system generates highly optimized binary code for the operation, which is transferred to the runtime system for execution when the operation is called. In a possible implementation manner, the user can also call the nclstoreoperation instruction interface to store an optimized operation instruction (such as a fusion operator), then the binary code corresponding to the operation instruction can be stored in the offline cache and its operation name serves as an index for search, otherwise, in order to ensure that the size of the programming library will not expand rapidly, the binary code corresponding to an unstored operation instruction will be discarded after the program exits.

Figure 21:
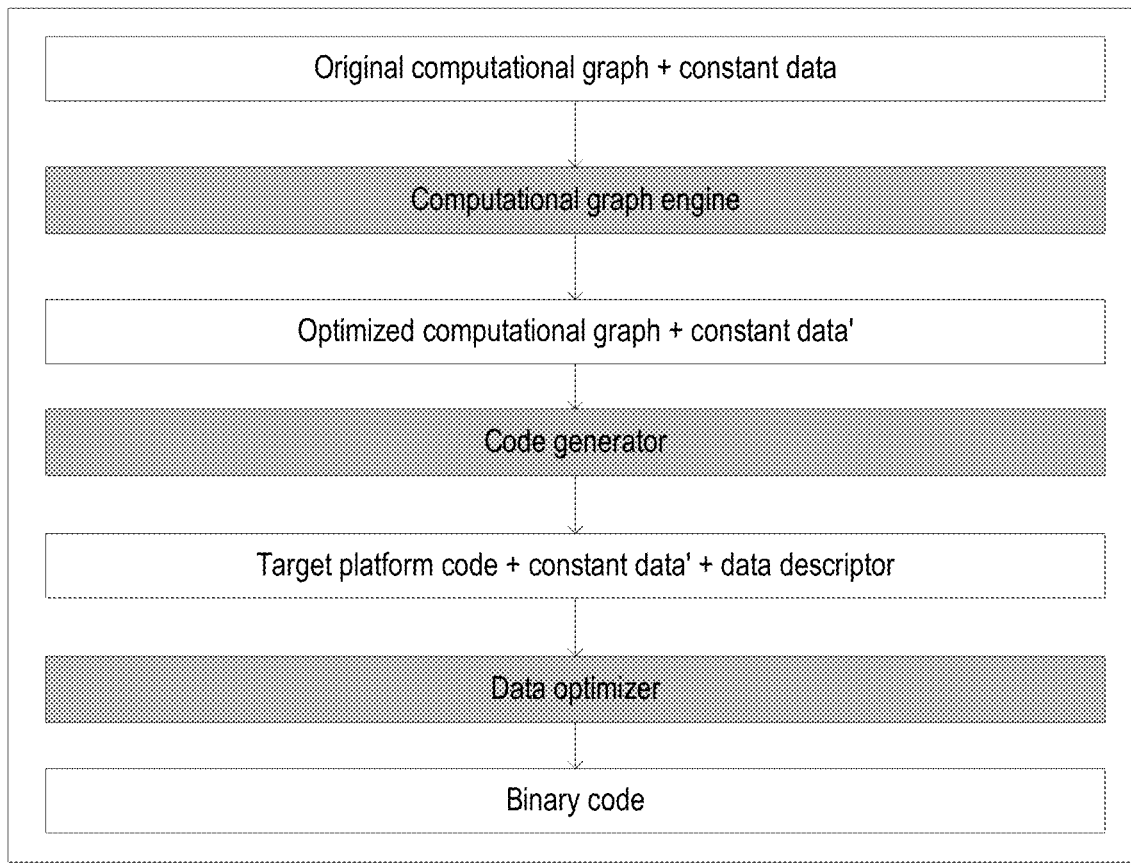
FIG. 21 is a diagram of a CDUCA architecture according to an embodiment of the present disclosure.

The specific process of just-in-time compilation of dynamic operation instructions is not limited, and can be flexibly selected according to the actual situation. In an embodiment of the present disclosure, a computation and data unified compilation architecture (CDUCA) is adopted to implement just-in-time compilation of dynamic operation instructions. FIG. 21 is a diagram of a CDUCA architecture according to an embodiment of the present disclosure. As shown in the figure, in a possible implementation manner, CDUCA includes three components: a computational graph engine, a code generator, and a data optimizer. CDUCA uniformly optimizes operations and data at multiple levels to generate efficient binary codes. The three components may be implemented in different manners. In a possible implementation manner, the functions that the three components can realize are as follows.

Computational graph engine: using optimization techniques such as linear transformation and constant folding to perform algorithm-oriented and advanced optimization on the original computational graph and constant data, and generating the optimized computational graph and constant data.

Code generator: adopting a heuristic search strategy based on a cost model to perform perform computation and data unified compilation optimization on the computational graph and constant data, and generating an efficient target platform code and a data descriptor.

Data optimizer: parsing a data descriptor, performing optimization such as splitting, reordering, and precision conversion on constant data for the target platform, and then packaging (address relocating, etc.) the optimized constant data and target platform code to generate the final binary code.

Based on the architecture of the disclosed embodiment above, in a possible implementation manner, the step S133 may include:

step S1331: according to the dynamic operation instruction, obtaining an original computational graph and original model data corresponding to the dynamic operation instruction;

step S1332, according to the original computational graph and the original model data, performing unified processing for the deep learning algorithm to obtain a first computational graph and first model data;

step S1333: generating a hardware instruction and a data descriptor according to the first computational graph;

step S1334: processing the first model data for the hardware platform according to the data descriptor to obtain second model data. and step S1335: obtaining the binary code of the deep learning algorithm according to the hardware instruction and the second model data.

It can be seen from the disclosed embodiment above that input of CDUCA is a computational graph and constant data. Therefore, in a possible implementation manner, it is necessary to obtain an original computational graph and original model data corresponding to a dynamic instruction in the step S1331, the implementation manner of the step S1331 is not limited. In a possible implementation manner, the step S1331 may include:

obtaining the original computational graph corresponding to the dynamic operation instruction by analyzing the dynamic operation instruction; and obtaining the original model data according to parameters of the dynamic operation instruction.

Figure 22:
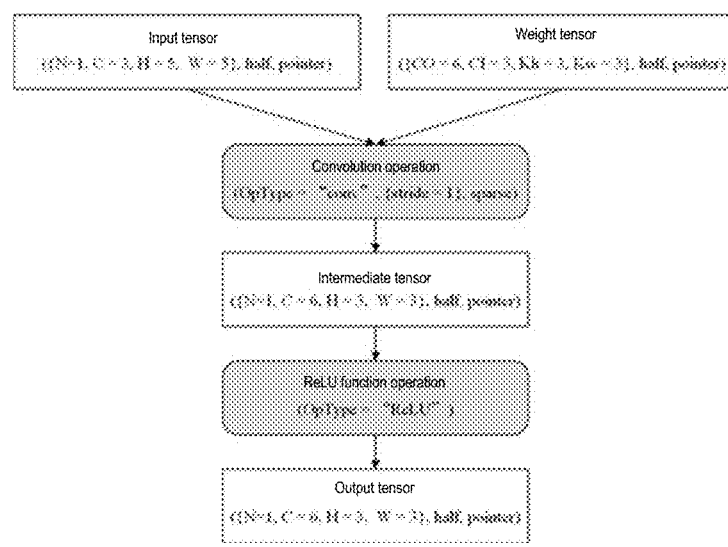
FIG. 22 shows a form of an original computational graph according to an embodiment of the present disclosure.

Based on the disclosed embodiment above, in an example, a method of obtaining an original computational graph and original model data corresponding to the dynamic instruction may be: according to the parameters of the dynamic operation instruction, the original model data can be directly obtained, and the original computational graph can be generated when the dynamic operation instruction is parsed by NCLA. A specific parsing process can be flexibly determined according to the actual situation and is not limited here. FIG. 22 shows a form of an original computational graph according to an embodiment of the present disclosure. As shown in the figure, in an example, the original computational graph contains two graph nodes: Tensor and operation instruction, which respectively correspond to input and output data and data transformation of the operation instruction.

It can be seen from the disclosed embodiment above that the step S1332 can correspond to the computational graph engine component in CDUCA, and the implementation manner of the computational graph engine is not limited, and can be flexibly determined according to the actual condition.

A node in a computational graph can be used to represent an operation performed in a deep learning process. Common operations in deep learning algorithms can include convolution, full connection, activation, pooling, batch normalization, scaling, etc. These operations can be divided into linear transformation operations and non-linear transformation operations according to their specific implementation manners. All linear transformation operations can be expressed as multiplication and addition of vector or matrix. Therefore, a general expression of linear transformation operations may be:

$$Y=X*W+B$$

X and Y are variables; W and B are model data constants.

Any linear transformation operation can be expressed by the general expression form above. Therefore, an operation that cannot be expressed by the general expression form is a non-linear transformation operation. In an example, among the common operations of deep learning algorithms listed above, convolution, full connection, batch normalization, and scaling operations are linear transformation operations, and pooling and activation are non-linear transformation operations. In an example, when a full connection operation is expressed by the general expression form, X and Y respectively represent an input neuron matrix and an output neuron matrix of the full connection, W represents a weight matrix, and B represents a bias matrix. The specific expression of other linear transformation operations that are expressed by the general expression will not be described here.

For linear transformation operations, if there are two consecutive linear transformation operations, which are:

$$Y_1 = X_1 * W_1 + B_1$$

$$Y_2 = Y_1 * W_2 + B_2$$

Since linear transformation operations satisfy the distributive law and the associative law, and W and B in the general expression form of linear transformation operations are constant, therefore, equivalent linear transformations of the two linear transformation operations are as follows:

$$Y_2 = (X_1 * W_1 + B_1) * W_2 + B_2$$

$$Y_2 = X_1 * W_1 * W_2 + B_1 * W_2 + B_2$$

$$W'=W_1*W_2, B'=B_1*W_2+B_2$$

$$Y_2=X_1*W'+B'$$

Through the above-mentioned equivalent linear transformation, the original linear transformation operation can be optimized as a whole through a linear transformation optimization method and a constant folding optimization method, and finally be simplified into a one-step linear transformation operation. Through the above-mentioned linear transformation optimization method and the constant folding optimization method, the model data can be compressed and computations can be reduced. On the one hand, the storage overhead of model data can be reduced, and on the other hand, the memory access at runtime can be reduced.

Therefore, in a possible implementation manner, a specific implementation manner of the unified processing for the deep learning algorithm may be linear transformation and constant folding.

Figure 23:
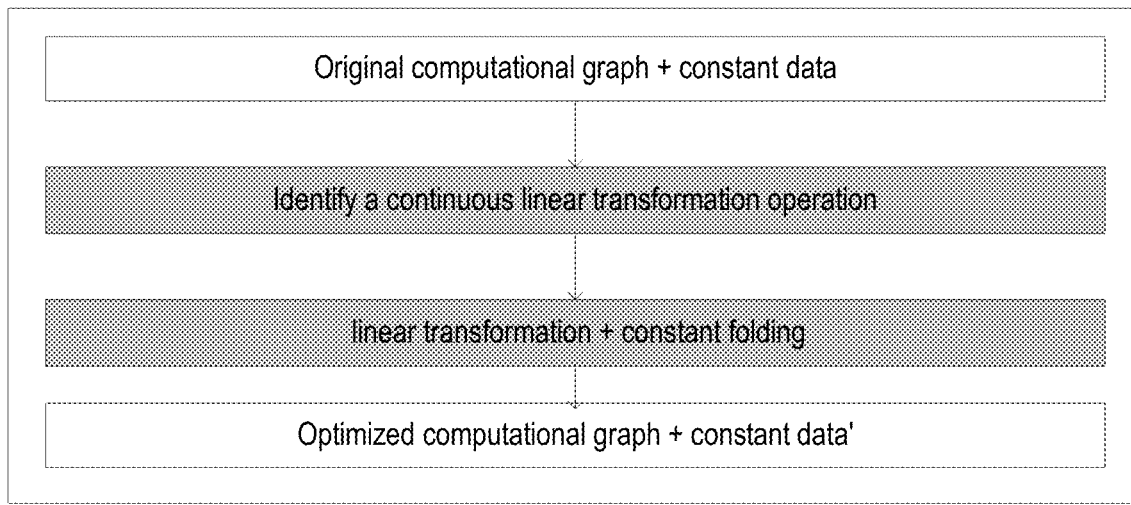
FIG. 23 shows a working flowchart of a computational graph engine according to an embodiment of the present disclosure.

FIG. 23 shows a working flowchart of a computational graph engine according to an embodiment of the present disclosure. As shown in the figure, in a possible implementation manner, the step S1332 may include:

step S13321: reading the original computational graph and the original model data;

step S13322: identifying continuous linear transformation operation nodes in the original computational graph; and step S13323, processing the continuous linear transformation operation nodes through linear transformation and constant folding to obtain a first computational graph and first model data.

From the description above, it can be seen that two continuous linear transformation operations can be simplified into one linear transformation operation through linear transformation and constant folding. When there are three continuous linear transformation operations, the first two continuous linear transformations can be simplified into one linear transformation operation through linear transformation and constant folding, and then the simplified linear transformation operation and the remaining linear transformation operation are again simplified into one linear transformation operation through linear transformation and constant folding. Similarly, when there are more continuous linear transformation operations, these linear transformation operations can be combined and simplified into at least one linear transformation operation through linear transformation and constant folding.

Since each linear transformation operation corresponds to a linear transformation operation node in the computational graph, in a possible implementation manner, the continuous linear transformation operation nodes may include: at least 2 continuous linear transformation operation nodes. In this way, the continuous linear transformation operation nodes correspond to at least two continuous linear transformation operations. The count of continuous linear transformation operation nodes is not limited, and can be determined according to the actual situation of the computational graph.

In a possible implementation manner, a specific process of the step S13323 may include:

performing linear transformation and constant folding on the continuous linear transformation operation nodes in the original computational graph, and combining the continuous linear transformation operation nodes to obtain a first computational graph; and combining model data corresponding to the continuous linear transformation operation nodes to obtain first model data.

Figure 24:
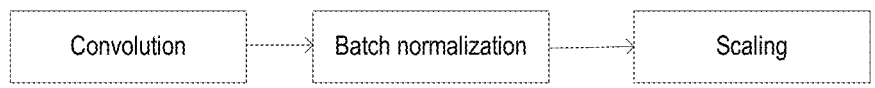
FIG. 24 shows a diagram of an image classification network structure that includes a sub-structure according to an embodiment of the present disclosure.

In an example, the continuous linear transformation operation nodes in the original computational graph are node 1, node 2, node 3, and node 4 which are connected in sequence. A corresponding model data combination can be model data group 1. Through linear transformation and constant folding, node 1, node 2, node 3, and node 4 can be combined into one node, so that node 5 is finally obtained. In this process, since the model data group 1 has been subject to constant folding, model data of the group may be combined, and finally a combined model data group can be obtained, which is called model data group 2. In an example, the continuous linear transformation operation nodes in the original computational graph are node 1, node 2, node 3, and node 4 which are connected in sequence. A corresponding model data combination can be model data group 1. Through linear transformation and constant folding, node 1, node 2 and node 3 can be combined into node 6. Node 6 and node 4 will not be combined. In this way, node 4 and node 6 can be obtained finally. In this process, since node 1, node 2 and node 3 have been subject to constant folding, a corresponding model data combination in the model data group 1 may be combined, and finally a combined model data group can be obtained, which can be called model data group 3. Since the model data corresponding to the original node 4 has not been subject to constant folding, the model data group 3 and the model data corresponding to node 4 are combined to obtain a model data group 4 corresponding to the current overall linear transformation operations. It can be inferred from the two examples above, when the count of continuous linear transformation operation nodes in the original computational graph changes, the specific process of the step S13323 may also be changed accordingly, which will not be listed here. In an example, the neural network corresponding to the deep learning algorithm may be the classic image classification network ResNet. FIG. 24 shows a diagram of an image classification network structure that includes a sub-structure according to an embodiment of the present disclosure. As shown in the figure, ResNet may includes a sub-structure of convolution+batch normalization+scaling. Since convolution, batch normalization, and scaling are all linear transformation operations, in a computational graph corresponding to ResNet, the linear transformation operation method described above can be performed on the three operation nodes corresponding to the sub-structure. In this way, the three nodes are finally combined into one operation node through linear transformation and constant folding, followed by the combining of model data involved in the three operation nodes.

Through any of the above-mentioned processes, the computation process of the deep learning algorithm can be optimized, and the first computational graph and the first model data after unified processing of the deep learning algorithm can be obtained. In this way, the memory access for running the deep learning algorithm can be reduced, and the storage overhead for storing model data can also be reduced.

Based on the first computational graph and the first model data, a hardware instruction and a data descriptor can be generated by performing the step S1333. The specific implementation manner of the step S1333 is not limited. Any process that can generate a hardware instruction based on a computational graph can be used as an implementation manner of the step S1333.

A main purpose of the step S1333 is to generate a hardware instruction that is readable by the corresponding hardware platform based on the first computational graph optimized in the step S1332. In order to optimize the memory access performance of the hardware platform, an on-chip memory is often placed in an area that is near a computation position of the hardware platform. In an example, this area may be close to the computation unit of the deep learning processor. When the hardware platform is accessed, the speed of accessing the on-chip cache is often faster than that of accessing other locations. In an example, the other locations may include an off-chip double data rate synchronous dynamic random access memory. Affected by the location and function of the on-chip cache, the capacity of the on-chip cache is limited. In this case, the utilization of the on-chip cache can directly affect the performance optimization of the deep learning algorithm on the corresponding hardware platform. However, although operation optimization can be realized by the unified processing method for the deep learning algorithm proposed in the step S1332, the utilization rate of the on-chip cache cannot be improved. In a possible implementation manner, the utilization rate of the on-chip cache can be improved by optimizing the process of generating hardware instructions, and then the performance optimization effect of the deep learning algorithm on the corresponding hardware platform can be improved. Therefore, in a possible implementation manner, the step S1333 may include: processing the first computational graph according to the cost model, and using a heuristic search strategy to obtain a hardware instruction and a data descriptor.

Figure 25:
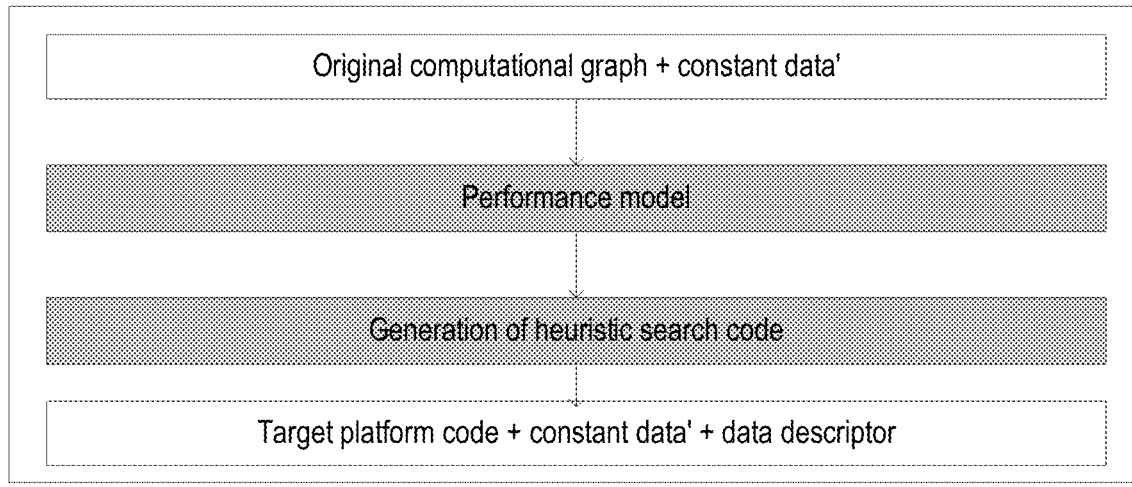
FIG. 25 is a flowchart of a deep learning algorithm compiling method according to an embodiment of the present disclosure.

The process of processing the first computational graph according to the cost model, and using a heuristic search strategy to obtain a hardware instruction and a data descriptor can be flexibly selected according to the actual condition. FIG. 25 is a flowchart of a deep learning algorithm compiling method according to an embodiment of the present disclosure. As shown in the figure, in a possible implementation manner, the step S1333 may include:

step S13331, modeling the first computational graph through the cost model to generate a search space and an objective function; and step S13332, searching in the search space by using the heuristic search strategy, and when the objective function reaches a threshold, generating a hardware instruction and a data descriptor for the hardware platform.

Figure 26:
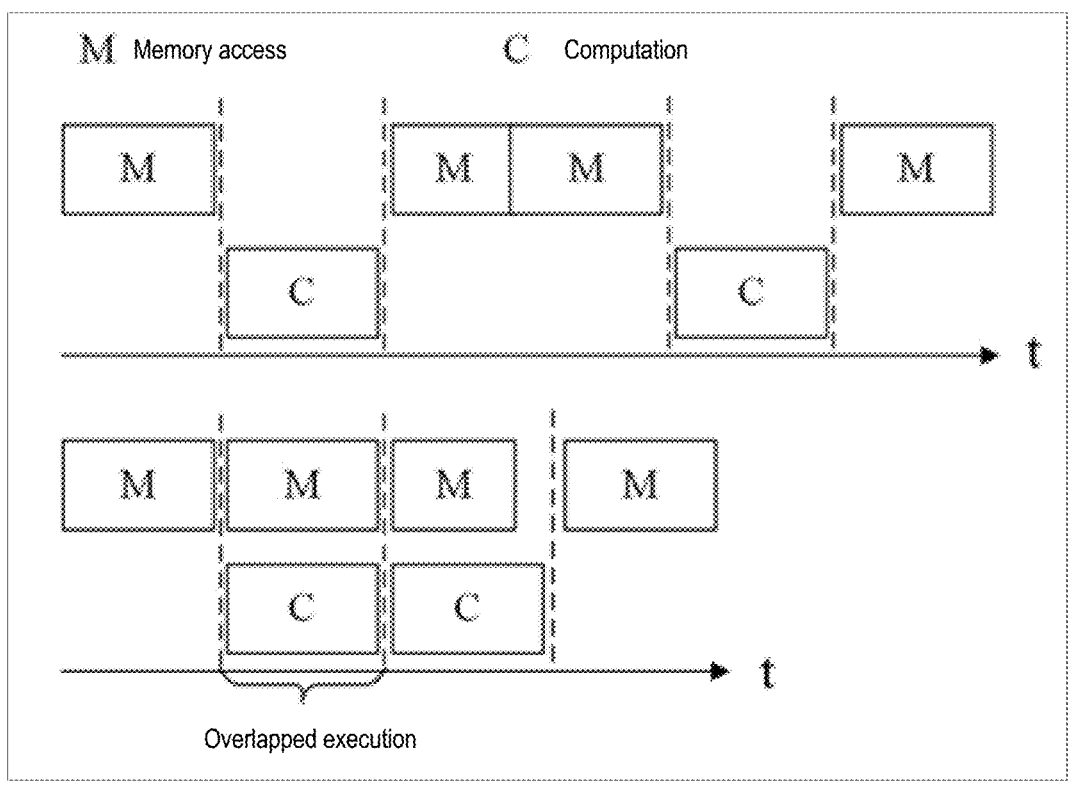
FIG. 26 is a diagram of an instruction flow according to an embodiment of the present disclosure.

There are many implementation manners for generating a hardware instruction based on a computational graph. For example, a computational graph can be used as input, then a hardware instruction for a hardware platform can be generated by searching for an optimum one in output of a model that can generate hardware instructions. The present disclosure does not limit the model used for generating hardware instructions is not limited. In a possible implementation manner, the first computational graph can be modeled by using a cost model. The cost model estimates the total time (including data format conversion and other overhead) a deep learning processor takes to perform an operation. Main factors that the model considers are: memory access time of the operation, operating time, and the overlap rate of the two. The three factors directly determine the performance of the program. Specifically, the deep learning processor includes an independent operation unit and a memory access unit. A computation instruction and a memory access instruction can be executed in a pipeline or overlapped in execution. FIG. 26 is a diagram of an instruction flow according to an embodiment of the present disclosure. As shown in the figure, in order to shorten the total running time of the program, it is necessary to reduce the computation time and the memory access time, and to increase the overlap rate of the execution of the two.

Therefore, after modeling the first computational graph by using the cost model, the generated hardware instruction is actually a search space composed of a variety of possible hardware instructions. The hardware instructions contained in the search space can indicate a plurality of selection manners during the operating process of the hardware platform: in an example, a hardware instruction can instruct the hardware platform to finish the loading of a complete piece of data into the on-chip cache in several times; in an example, a hardware instruction can instruct the hardware platform to finish the loading of a complete piece of data in several times, and to swap in/out between the on-chip cache and off-chip DDR according to demand; in one example, a hardware instruction can instruct the size of data to be processed when the hardware platform performs a vector operation processing. Since there are many kinds of hardware instructions in the search space. An instruction that will be finally applied is obtained by searching in the search space to find an optimal combination of instructions.

It can be seen from the above that the cost model can provide the estimated running time of the hardware instruction. Therefore, after the first computational graph is processed by using the cost model, the corresponding objective function can also be generated. The specific form of the objective function is not limited here and can be flexibly set according to the actual situation. The objective function can indicate how much time it takes to run the hardware instruction that is generated by searching in the search space. Therefore, when the objective function reaches the threshold, it indicates that the generated hardware instruction has met the requirement for running time, and further indicates that the generated hardware instruction can improve the performance of the hardware instruction when the hardware instruction runs on the hardware platform. Since the specific implementation form of the objective function is not limited, the threshold of the objective function is also not limited, and can be flexibly set according to the actual situation.

The way of searching in the generated search space is also not limited. In a possible implementation, brute-force search can be used for searching in the search space, but such a search process is time-consuming and may prolong the compilation process, which in turn may reduce the performance optimization effect of the deep learning algorithm on the corresponding hardware platform. In a possible implementation manner, a heuristic search strategy can be used for searching in the search space.

A purpose of the heuristic search strategy is to improve the search efficiency in the search space. Therefore, the present disclosure does not limit the specific search method, and can be flexibly selected according to the actual situation. In a possible implementation, the heuristic search strategy may include: a search strategy that improves the utilization rate of the on-chip cache in the hardware platform; or, a search strategy that reduces computation granularity and memory access granularity on the basis of ensuring the utilization of the operation unit and access unit in the hardware platform. In an example, a purpose of the heuristic search strategy is to use up the on-chip cache as much as possible. In this case, the search strategy can be set as a search strategy that improves the utilization rate of the on-chip cache in the hardware platform. In an example, a purpose of the heuristic search strategy is to select an instruction combination with a relatively small computation and access granularity under the premise of ensuring the utilization rate of the operation unit and the memory access unit in the hardware platform, so as to increase the coverage of computation and memory access. In this case, the search strategy can be set as a search strategy that reduces the operation and memory access granularity on the basis of ensuring the utilization rate of the operation unit and the access unit in the hardware platform. In an example, the heuristic search strategy can also be a strategy that strikes a balance between the two above-mentioned strategies, which is a search strategy that makes the two strategies reach a comprehensive optimal situation.

By using any of the above-mentioned search strategies, a hardware instruction for the hardware platform can be generated by searching in the search space. Since the content of the hardware instructions contained in the search space can indicate a variety of selection manners for the hardware platform in the operation process, when the search space is being searched, besides considering the operation performance of the hardware instructions, it may also be considered to use a generated hardware instruction to guide the hardware platform to optimize the model data so that the operation memory access speed and access efficiency of the hardware platform can be further improved. Therefore, based on this consideration, while generating a hardware instruction, the step S13332 can also generate a data descriptor to guide the further optimization of the model data.

Figure 27:
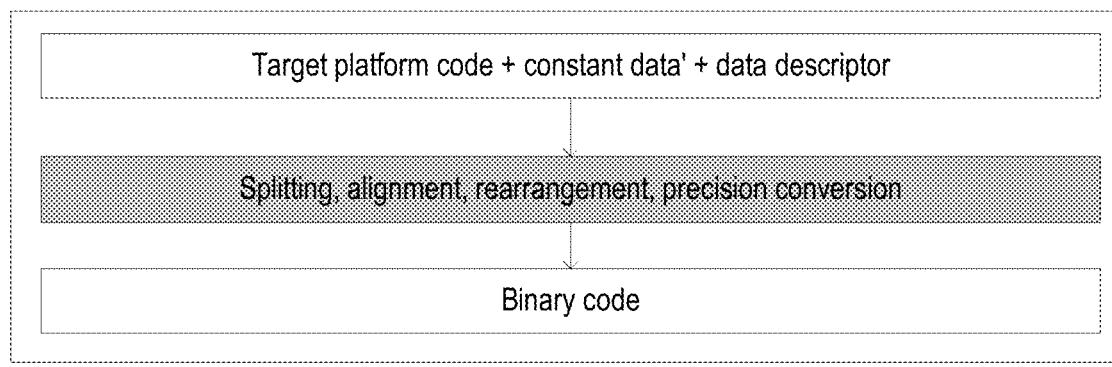
FIG. 27 is a diagram of an implementation manner of optimizing model data according to an embodiment of the present disclosure.

Based on the data descriptor generated in the step S1333, the first model data can be further optimized to obtain second model data. The implementation form of how the data descriptor optimizes the model data is not limited. FIG. 27 is a diagram of an implementation manner of optimizing model data according to an embodiment of the present disclosure. As shown in the figure, in a possible implementation manner, the step S1334 may include: according to the data descriptor and an operation requirement of the hardware platform, tiling the first model data; according to the data descriptor and the operation requirement of the hardware platform, aligning the first model data; or, according to the data descriptor and the operation requirement of the hardware platform, transforming a dimension of the first model data; or, according to the data descriptor and the operation requirement of the hardware platform, selecting precision for the first model data.

In a possible implementation manner of the disclosed embodiment above, data tiling can optimize loops and on-chip storage management, and can realize instruction pipeline. In terms of data alignment, since the deep learning processor supports vector and matrix operations, it has certain requirements for data alignment. Alignment access can speed up memory access and reduce DDR bank conflicts. In terms of data reordering, input data of operations such as convolution are multi-dimensional arrays. The arrangement order of the multi-dimensional arrays may affect the number of memory access jumps. Rearranging data can improve memory access locality and reduce the MMU miss rate. In terms of precision conversion (type convert), the deep learning processor usually supports low-precision operations, such as half-precision floating point, quantization of different bits. Different precision operations have different performance. Proper data precision conversion can improve the overall performance of the program. Precision conversion is a specific implementation manner of the automatic precision selection function of NCLAPI.

Figure 28:
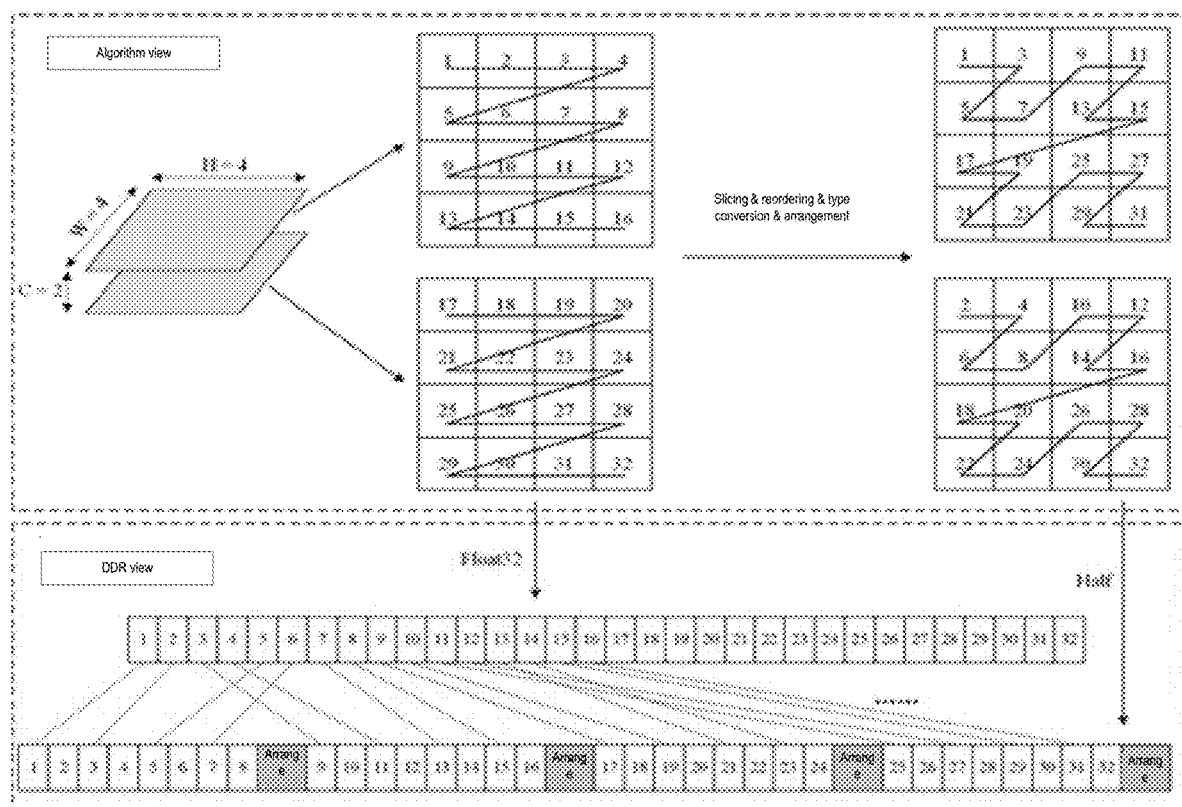
FIG. 28 is a diagram of optimizing split data according to an embodiment of the present disclosure.

The specific implementation manner of data tiling is not limited. FIG. 28 is a diagram of optimizing data after the data is tiled according to an embodiment of the present disclosure. As shown in the figure, in an example, constant data with 2 channels and both height and width being 4 is to be optimized. It is supposed that the data descriptor requires the following data transformation: height and width are tiled into two at the same time; the arrangement of the data is adjusted from HWC to CHW; and the data operation precision is adjusted from float32 to half. According to the above description, the data optimizer implements physical transformations such as tiling, rearranging, precision converting, and aligning on the data from the DDR perspective to finally obtain the optimized data.

In an example, the hardware platform may have a certain requirement for data alignment during the process of operating according to the hardware instruction. If this process is performed in the hardware platform, the performance of the hardware platform at runtime may be greatly reduced. Therefore, according to the data descriptor, the data to be aligned can be aligned in advance during the compilation process, thereby speeding up the memory access speed when the hardware platform is working. The specific alignment standard and method are not limited here, and can be determined according to the actual requirement of the hardware platform. In an example, when the hardware platform performs an operation according to the hardware instruction, some algorithms such as convolution algorithm may require data to be interpreted into multi-dimensional arrays, however, the arrangement order of the multi-dimensional arrays may affect the number of memory access jumps and may further influence the performance of the hardware platform at runtime. Therefore, according to the data descriptor, during the compilation process, the model data can be dimensionally transformed in advance in accordance with the operation requirement to improve the memory access locality, thereby minimizing the memory access jumps of the hardware platform. The specific dimensional transformation and transformation method are not limited, and can be determined according to the actual requirement of the hardware platform. In an example, different operation precision corresponds to the different operation speed, and the hardware platform may support different operation precision. In an example, the hardware platform may be better at supporting low-precision operations. If high-precision operations are used, the operation speed of the hardware platform may be reduced. Therefore, according to the data descriptor, preferred model data precision can be selected in advance according to the precision requirement of the hardware platform during the compiling process. The specific data precision selected is again not limited, and can be determined according to the requirement of the hardware platform. In an example, the preferred precision may be 16-bit quantization precision. In an example, the preferred precision may be 8-bit quantization precision.

The above-mentioned process of processing and optimizing the first model data into the second model data can be any of the four methods, or any combination of the four methods, or may also include other methods that improves the hardware platform speed, which will not be listed here. By optimizing the model data in advance during the compiling process, the performance of the hardware platform at runtime can be greatly improved, such as improving the memory access speed and efficiency.

Based on the above process, the binary code of the deep learning algorithm can be obtained. The content contained in this binary code may have various forms. In a possible implementation manner, the step S1335 may include: packing the hardware instruction and the second model data to obtain the binary code of the deep learning algorithm.

In an example, the hardware instruction may be a hardware instruction that is generated according to the first computational graph, and the second model data may be model data that is obtained by uniformly processing the original model data for the deep learning algorithm and then processing the data for the hardware platform. In other words, the finally obtained binary code of the deep learning algorithm is obtained from the content that is obtained by sequentially performing the steps S1332, step S1333, and step 1334. In an example, the hardware instruction may be a hardware instruction that is directly generated based on the original computational graph. The second model data may be model data obtained by only processing the original model data for the hardware platform. In other words, the final executable file of the deep learning algorithm is obtained by only sequentially performing the steps S1333 and S1334. In an example, the hardware instruction may be a hardware instruction generated according to the first computational graph, and the second model data may be the first model data. In other words, the final executable file of the deep learning algorithm is obtained by only sequentially performing the steps S1332 and S1333. In an example, the hardware instruction may be a hardware instruction directly generated according to the original computational graph, and the second model data may be the original model data. In other words, the final executable file of the deep learning algorithm is obtained by only performing the step S1333. It can be seen from the examples above that S1332, S1333, and S1334 may not exist at the same time, and can be combined flexibly according to the actual condition.

The CDUCA implemented by the above disclosed embodiments can integrate the aforementioned compilation optimization techniques such as memory reuse, operation fusion, delay concealment, linear algebra transformation, common sub-expression elimination, constant propagation, dead code elimination, and data parallel. In addition, the hierarchical structure of CDUCA has strong scalability. Developers can integrate various compilation optimization techniques in each module of CDUCA. For example, an operation aggregation technique can be integrated in a computational graph engine module, and polyhedral compilation optimization technique can be integrated in a code generator module. Just-in-time compilation of dynamic operation instructions by using CDUCA can effectively improve compilation efficiency, thereby increasing the operation speed of the hardware device.

It can be seen from the disclosed embodiments above that the binary code of the deep learning algorithm can be generated by using the two methods: just-in-time compilation and static search. However, it can also be seen from the disclosed embodiments above that the overall architecture of NCLA also includes a runtime system. Therefore, in a possible implementation manner, the method provided by the embodiments of the present disclosure further includes: executing the binary code of the deep learning algorithm in the deep learning processor through the runtime system.

The implementation manner of the runtime system is not limited. FIG. 29 is a diagram of modules and functions of a runtime system according to an embodiment of the present disclosure. As shown in the figure, the runtime system can be responsible for the interaction between the host and the deep learning processor. The runtime system can encapsulate the device driver interface and provide the upper layer with functions such as device management, memory management, operation execution, and device synchronization.

It can be seen from the disclosed embodiments above that the deep learning algorithm can be compiled through NCLA. Experiments prove that a specific implementation of NCLA can be deployed on the deep learning processor platform and can support mainstream deep learning algorithms including image classification, target detection and natural language processing. An embodiment of the present disclosure use TensorFlow to conduct experiments on several commonly used deep learning applications. On average, the performance of binary code generated by the NCLA just-in-time compilation system can reach 83.24% of the performance of manually optimized code. In the best case, NCLA can at least realize 72.61% of the hardware peak performance. In addition, the successful case of NCLA further confirms the versatility of the neurological calculus and the NCLAPI mentioned in the disclosed examples.

Figure 30:
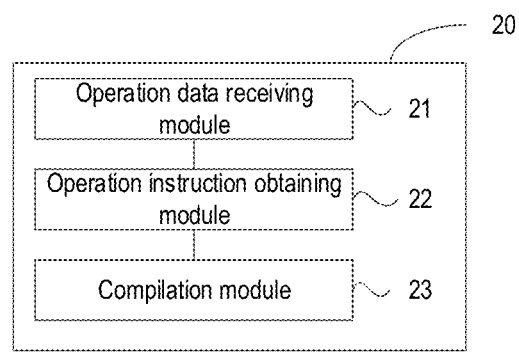
FIG. 30 is a block diagram of a deep learning algorithm compiling device according to an embodiment of the present disclosure.

FIG. 30 shows a block diagram of a deep learning algorithm compiling device according to an embodiment of the present disclosure. As shown in the figure, the device 20 includes: an operation data receiving module 21 configured to receive operation data transferred by a deep learning programming library interface; an operation instruction obtaining module 22 configured to obtain an operation instruction included in the operation data; and a compilation module 23 configured to determine an instruction type of the operation instruction, and execute a compilation operation corresponding to the instruction type according to the determination result to obtain a binary code of the deep learning algorithm.

In a possible implementation manner, the operation instruction is created or called according to a user instruction received by the deep learning programming library interface.

In a possible implementation manner, the compilation module includes: a determination unit configured to determine the instruction type of the operation instruction; and a static search unit configured to, when the instruction type is a static operation instruction, according to the name of the static operation instruction, searching for the corresponding binary code in the static operation pool as the binary code of the deep learning algorithm.

In a possible implementation manner, the static search unit is configured to: according to the name of the static operation instruction, search for the binary code corresponding to the name in the static operation pool, and when the search result is success, return the binary code as the binary code of the deep learning algorithm.

In a possible implementation manner, the static search unit is further configured to: when the search result is fail, using the static operation instruction as a dynamic operation instruction to perform just-in-time compilation.

In a possible implementation manner, the static operation instruction includes one or more of a customized operation instruction, a build-in operation instruction, and an offline operation instruction. The customized operation instruction includes an operation instruction that has a customized function and that is implemented according to an encoding method and an encapsulation form of the operation instruction. The build-in operation instruction includes an own operation instruction that is included in the deep learning programming library interface. The offline operation instruction includes a pre-compiled dynamic operation instruction, where the pre-compiled result is stored in the offline cache.

In a possible implementation manner, the process of generating the binary code corresponding to the customized operation instruction includes: encapsulating the user instruction corresponding to the operation instruction according to the interface of the operation instruction and a data structure definition to obtain the encapsulated user instruction; compiling the encapsulated user instruction to obtain a compiled result; inserting the compiled result into the static operation pool in a form of dynamic link or static link to obtain the binary code corresponding to the customized operation instruction.

In a possible implementation manner, the static operation pool may include a static operation source file. The static operation source file includes a static code segment, a static data segment, a dynamic code segment, and a dynamic data segment. The static code segment is used to store the binary code corresponding to the build-in operation instruction. The dynamic code segment is used to store the binary code corresponding to the customized operation instruction. The static data segment is used to store tensor data corresponding to the build-in operation instruction. The dynamic data segment is used to store tensor data corresponding to the customized operation instruction.

In a possible implementation manner, the static operation pool further includes an offline cache. The offline cache includes an offline file and an index table. The offline file is used to store a pre-compiled result of the offline operation instruction. The index table is used to indicate a location where the pre-compiled result of the offline operation instruction is stored in the offline file.

In a possible implementation manner, the static search unit is further configured to: according to the name specified when the static operation instruction is created, in the static operation pool, sequentially search for a binary code corresponding to the customized operation, a binary code corresponding to the build-in operation, and a binary code corresponding to the offline operation, so as to obtain the binary code corresponding to the name.

In a possible implementation manner, the compilation module further includes a dynamic compilation unit which is configured to: when the instruction type is a dynamic operation instruction, perform just-in-time compilation on the dynamic operation instruction to obtain a just-in-time compilation result as the binary code of the deep learning algorithm.

In a possible implementation manner, the dynamic compilation unit includes: an original data obtaining subunit that is configured to obtain the original computational graph and original model data corresponding to the dynamic operation instruction according to the dynamic operation instruction; a unified processing subunit that is configured to perform unified processing for the deep learning algorithm according to the original computational graph and original model data to obtain the first computational graph and the first model data; a hardware instruction generation subunit that is configured to generate a hardware instruction and a data descriptor according to the first computational graph; a model data processing subunit that is configured to process the first model data for the hardware platform according to the data descriptor to obtain second model data; and a binary code generation subunit that is configured to obtain the binary code of the deep learning algorithm according to the hardware instruction and the second model data.

In a possible implementation manner, the original data obtaining subunit is configured to obtain the original computational graph corresponding to the dynamic operation instruction by parsing the dynamic operation instruction; and obtain the original model data according to parameters of the dynamic operation instruction.

In a possible implementation manner, the unified processing subunit is configured to: read the original computational graph and the original model data; identify continuous linear transformation operation nodes in the original computational graph; use linear transformation and constant folding to process the continuous linear transformation operation nodes to obtain the first computational graph and the first model data.

In a possible implementation manner, the hardware instruction generation subunit is configured to: process the first computational graph according to a cost model, and use a heuristic search strategy to obtain a hardware instruction and a data descriptor.

In a possible implementation manner, the model data processing subunit is configured to: according to the data descriptor and the operation requirement of the hardware platform, align the first model data; or, according to the data descriptor and the operation requirement of the hardware platform, transform a dimension of the first model data; or, according to the data descriptor and the operation requirement of the hardware platform, select precision for the first model data.

In a possible implementation manner, the binary code generation subunit is configured to pack the hardware instruction and the second model data to obtain the binary code of the deep learning algorithm.

In a possible implementation manner, the dynamic operation instruction includes a specialized operation instruction and/or a fusion operation instruction. The specialized operation instruction includes an operation instruction obtained by converting an operation instruction of which input parameters are bound. The fusion operation instruction includes an operation instruction obtained by combining a plurality of operation instructions according to a calling sequence.

In a possible implementation manner, the specialized operation instruction includes a fully specialized operation instruction, a partial specialized operation instruction, and a pseudo-specialized operation instruction. The fully specialized operation instruction includes an operation instruction of which all input parameters are bound. The partial specialized operation instruction includes an operation instruction obtained after N input parameters of the operation instruction are bound, where N is a positive integer less than the count of the input parameters of the operation instruction. The pseudo-specialized operation instruction includes an operation instruction that is directly converted without binding input parameters of the operation instruction.

In a possible implementation manner, the process of creating the fusion operation instruction includes: creating the name of the fusion operation instruction; determining fused sub-operation instructions according to operation instructions to be fused; and according to the calling sequence of the operation instructions to be fused, determining an operation connection relationship between the fused sub-operation instructions; connecting the fused sub-operation instructions according to the operation connection relationship to obtain a connection result; setting an input parameter and an output parameter of the fusion operation instruction according to a user instruction corresponding to the fusion operation instruction; and packing the name, the connection result, the input parameter, and the output parameter to obtain the fusion operation instruction.

In a possible implementation manner, the device further includes an execution module that is configured to execute the binary code of the deep learning algorithm in the deep learning processor through a runtime system.

In a possible implementation manner, the operation data further includes tensor data. The tensor data includes a shape attribute, a logical data type attribute, a physical data type attribute, and a physical layout attribute.

In a possible implementation manner, the device is further configured to: extend the class of the deep learning framework, and encapsulate the tensor data and the operation instruction in the data of the deep learning framework to integrate the deep learning framework and the deep learning programming library interface.

In a possible implementation manner, the present disclosure also provides a deep learning operation device which includes any one of the above-mentioned possible deep learning algorithm compilation devices. The deep learning operation device is used to complete a preset deep learning operation.

Figure 31:
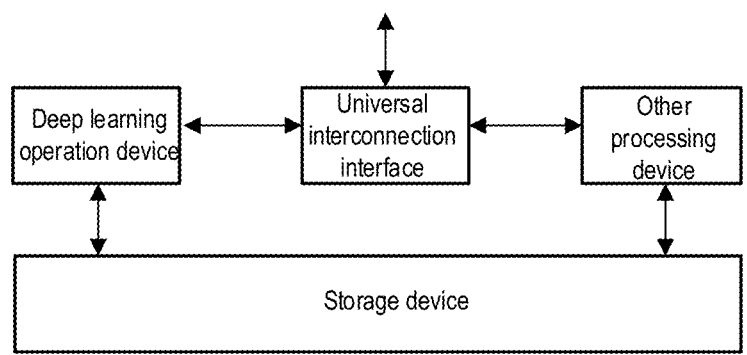
FIG. 31 shows a block diagram of a combined processing device according to an embodiment of the present disclosure.

FIG. 31 is a block diagram of a combined processing device according to an embodiment of the present disclosure. As shown in the figure, the combined processing device includes the above-mentioned deep learning operation device, a universal interconnection interface, and another processing device.

The deep learning operation device interacts with the another processing device to perform operations specified by the user. The another processing device includes one or more types of general-purpose/special-purpose processors such as a central processing unit (CPU), a graphics processing unit (GPU), a neural network processor, and the like. The present disclosure does not limit a count of processors included in the another processing device. The another processing device serves as an interface that connects the deep learning operation device to external data and control including data moving, and can perform the basic control such as starting and stopping the deep learning operation device. The another processing device may also cooperate with the deep learning operation device to complete computation tasks. The universal interconnection interface is configured to transfer data and a control instruction between the deep learning operation device and the another processing device. The deep learning operation device is configured to obtain required input data from the another processing device and write the data in an on-chip storage device of the deep learning operation device. The deep learning operation device may obtain a control instruction from the another processing device, and write the control instruction in an on-chip control cache of the deep learning operation device. The deep learning operation device may further read data stored in a storage module of the deep learning operation device and transfer the data to the another processing device.

The combined processing device may also include a storage device. The storage device is connected to the deep learning operation device and the another processing device respectively. The storage device is configured to store data of the deep learning operation device and the another processing device. The storage device may be particularly suitable for a case where data to be computed cannot be entirely stored in an internal memory of the deep learning operation device or the another processing device.

The combined processing device can be used as an SOC (System On Chip) of a device including a mobile phone, a robot, a drone, a video surveillance device, and the like, which may effectively reduce the core area of a control component, increase the processing speed, and reduce the overall power consumption. In this case, the universal interconnection interface of the combined processing device may be connected to some components of the device. The some components include, for example, a webcam, a monitor, a mouse, a keyboard, a network card, and a WIFI interface.

In some possible embodiments, the present disclosure provides a deep learning chip including the deep learning operation device or the combined processing device.

In some embodiments, the present disclosure provide a chip encapsulation structure which includes the above-mentioned chip.

In some embodiments, the present disclosure provide a board card which includes the above-mentioned chip encapsulation structure.

In a possible implementation manner, an electronic device is provided. The electronic device includes the board card.

The electronic device includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

It should be noted that, the foregoing embodiments of method, for the sake of conciseness, are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and the actions and modules involved are not necessarily required for this disclosure.

In the embodiments above, the description of each embodiment has its own emphasis. For a part that is not described in detail in one embodiment, reference may be made to related descriptions in other embodiments.

In the several embodiments provided in this disclosure, it should be understood that the disclosed device may be implemented in other ways. For instance, the embodiments above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the embodiments of the present disclosure.

In addition, the functional units in each embodiment of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer equipment (which may be a personal computer, a server, or a network equipment, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

A person of ordinary skill in the art may understand that all or part of the steps of the foregoing embodiments of method may be completed by a program instructing related hardware. The program may be stored in a computer-readable memory, and the memory may include a flash disk, a read-only memory (ROM), a random access memory (RAM), a magnetic disk, an optical disk, or the like.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

Aspects of the present disclosure are described according to the flowcharts and/or the block diagrams of the method, the device (system), and the computer program product provided by the present disclosure. It should be understood that each block of the flowcharts and/or block diagrams and combinations of the blocks in the flowcharts and/or block diagrams can be implemented by computer-readable program instructions.

The flowcharts and block diagrams in the drawings show the possible implementation architecture, functions, and operations of the system, the method, and the computer program product according to the plurality of embodiments of the present disclosure. In this regard, each block in the flowcharts or block diagrams may represent a module, a program segment, or a part of an instruction. The module, the program segment, or the part of an instruction contains one or more executable instructions for realizing a specified logic function. In some alternative implementations, a function marked in the block may also occur in a different order from the order indicated in the drawings. For example, depending on a function involved, two consecutive blocks can actually be executed in parallel, or sometimes be executed in reverse order. It should also be noted that each block in the block diagrams and/or flowcharts, and the combination of the blocks in the block diagrams and/or flowcharts, can be implemented by a dedicated hardware-based system that performs a specified function or action, or can be realized by a combination of dedicated hardware and a computer instruction.

The embodiments of the present disclosure have been described above. The description above is exemplary rather than exhaustive, and is not limited to the disclosed embodiments. Without departing from the scope and spirit of the described embodiments, many modifications and changes are obvious to those of ordinary skill in the art. The choice of terms used herein is intended to best explain the principles, implementations, or improvements on the current technology in the market of the embodiments, or to enable other ordinary skilled in the art to understand the embodiments disclosed herein.

The foregoing can be better understood according to the following articles:

A1. A deep learning algorithm compiling method, comprising:
   receiving operation data transferred by a deep learning programming library interface;
   obtaining an operation instruction included in the operation data; and
   determining an instruction type of the operation instruction, and executing a compilation operation corresponding to the instruction type according to the determination result to obtain a binary code of the deep learning algorithm.

A2. The method of A1, wherein, the operation data is created or called according to a user instruction received by the deep learning programming library interface.

A3. The method of A2, wherein, determining an instruction type of the operation instruction, and executing a compilation operation corresponding to the instruction type according to the determination result to obtain a binary code of the deep learning algorithm includes:
   determining an instruction type of an operation instruction, and
   when the instruction type is a static operation instruction, searching for a corresponding binary code in the static operation pool according to the name of the static operation instruction, and using the binary code as the binary code of the deep learning algorithm.

A4. The method of A3, wherein, when the instruction type is the static operation instruction, searching for a corresponding binary code in the static operation pool according to the name of the static operation instruction, and using the binary code as the binary code of the deep learning algorithm includes:
   according to the name of the static operation instruction, searching for a binary code corresponding to the name in the static operation pool, and
   when the search result is success, returning the binary code as the binary code of the deep learning algorithm.

A5. The method of A4, wherein, when the instruction type is the static operation instruction, searching for a corresponding binary code in the static operation pool according to the name of the static operation instruction, and using the binary code as the binary code of the deep learning algorithm includes:
   when the search result is failure, use the static operation instruction as a dynamic operation instruction and perform just-in-time compilation.

A6. The method of A3, wherein, the static operation instruction includes one or more of a operation instruction, a build-in operation instruction, and an offline operation instruction, wherein,
   the customized operation instruction includes an operation instruction that has a customized function and that is implemented according to an encoding method and an encapsulation form of the operation instruction,
   the build-in operation instruction includes an own operation instruction that is included in the deep learning programming library interface, and
   the offline operation instruction includes a pre-compiled dynamic operation instruction, wherein, a pre-compiled result is stored in an offline cache.

A7. The method of A6, wherein, a process of generating a binary code corresponding to the customized operation instruction includes:
- according to the interface and a data structure definition of an operation instruction, encapsulating a user instruction corresponding to the operation instruction to obtain an encapsulated user instruction,
- compiling the encapsulated user instruction to obtain a compiling result, and
- inserting the compiling result into a static operation pool in a manner of dynamic link or static link to obtain the binary code corresponding to the customized operation instruction.

A8. The method of A6 wherein, the static operation pool includes a static operation source file, wherein, the static operation source file includes a static code segment, a static data segment, a dynamic code segment, and a dynamic data segment, wherein,
- the static code segment is used to store the binary code corresponding to the build-in operation instruction,
- the dynamic code segment is used to store the binary code corresponding to the customized operation instruction,
- the static data segment is used to store tensor data corresponding to the build-in operation instruction, and
- the dynamic data segment is used to store tensor data corresponding to the customized operation instruction.

A9. The method of A8, wherein, the static operation pool further includes an offline cache, wherein, the offline cache includes an offline file and an index table, wherein,
- the offline file is used to store a pre-compiled result of the offline operation instruction, and
- the index table is used to indicate a location where the pre-compiled result of the offline operation instruction is stored in the offline file.

A10. The method of A6, wherein, according to the name of the static operation instruction, searching for a binary code corresponding to the name in the static operation pool includes:
- according to the name specified when the static operation instruction is created, in the static operation pool, sequentially searching for a binary code corresponding to the customized operation, a binary code corresponding to the build-in operation, and a binary code corresponding to the offline operation, so as to obtain the binary code corresponding to the name.

A11. The method of A3, wherein, determining an instruction type of the operation instruction, and executing a compilation operation corresponding to the instruction type according to the determination result to obtain a binary code of the deep learning algorithm further includes:
- when the instruction type is a dynamic operation instruction, performing just-in-time compilation on the dynamic operation instruction to obtain a just-in-time compilation result as the binary code of the deep learning algorithm.

A12. The method of any of A1-A11, wherein, when the operation instruction includes a dynamic operation instruction, performing just-in-time compilation on the dynamic operation instruction to obtain a just-in-time compilation result as the binary code of the deep learning algorithm includes:
- according to the dynamic operation instruction, obtaining an original computational graph and original model data corresponding to the dynamic operation instruction,
- according to the original computational graph and the original model data, performing unified processing for the deep learning algorithm to obtain a first computational graph and first model data,
- generating a hardware instruction and a data descriptor according to the first computational graph,
- processing the first model data for the hardware platform according to the data descriptor to obtain second model data, and
- obtaining the binary code of the deep learning algorithm according to the hardware instruction and the second model data.

A13. The method of A12, wherein, according to the dynamic operation instruction, obtaining an original computational graph and original model data corresponding to the dynamic operation instruction includes:
- obtaining the original computational graph corresponding to the dynamic operation instruction by parsing the dynamic operation instruction, and
- obtaining the original model data according to parameters of the dynamic operation instruction.

A14. The method of A12, wherein, according to the original computational graph and the original model data, performing unified processing for the deep learning algorithm to obtain a first computational graph and first model data includes:
- reading the original computational graph and the original model data,
- identifying continuous linear transformation operation nodes in the original computational graph, and
- processing the continuous linear transformation operation nodes through linear transformation and constant folding to obtain a first computational graph and first model data.

A15. The method of A12, wherein, generating a hardware instruction and a data descriptor according to the first computational graph includes:
- processing the first computational graph according to a cost model, and using a heuristic search strategy to obtain a hardware instruction and a data descriptor.

A16. The method of A12, wherein, processing the first model data for the hardware platform according to the data descriptor to obtain second model data includes:
- performing data alignment on the first model data according to the data descriptor and an operation requirement of the hardware platform, or,
- performing dimensional transformation on the first model data according to the data descriptor and an operation requirement of the hardware platform, or,
- selecting precision for the first model data according to the data descriptor and an operation requirement of the hardware platform.

A17. The method of A12, wherein, obtaining the binary code of the deep learning algorithm according to the hardware instruction and the second model data includes:
- obtaining the binary code of the deep learning algorithm by packing the hardware instruction and the second model data.

A18. The method of A11, wherein, the dynamic operation instruction includes a specialized operation instruction and/or fusion operation instruction, wherein,
- the specialized operation operation includes an operation instruction obtained by converting the operation instruction to which input parameters are bound, and
- the fusion operation operation instruction includes an operation instruction obtained by combining a plurality of operation instructions according to a calling sequence.

A19. The method of A18, wherein, the specialized operation instruction includes a fully specialized operation instruction, a partial specialized operation instruction, and a pseudo-specialized operation instruction, wherein,
- the fully specialized operation instruction includes an operation instruction obtained by converting the operation instruction to which all input parameters are bound,
- the partial specialized operation instruction includes an operation instruction obtained by converting the operation instruction to which N input parameters are bound, wherein N is a positive integer less than a count of the input parameters of the operation instruction, and
- the pseudo-specialized operation instruction includes an operation instruction obtained by converting the operation instruction to which input parameters are not bound.

A20. The method of A18, wherein, a process of creating the fusion operation instruction includes:
- creating a name of the fusion operation instruction,
- determining fusion operation sub-instructions according to operation instructions to be fused,
- determining an operation connection relationship between the fusion operation sub-instructions according to a calling sequence of the operation instructions to be fused,
- connecting the fusion operation sub-instructions according to the operation connection relationship to obtain a connection result,
- setting input parameters and output parameters of the fusion operation instruction according to a user instruction corresponding to the fusion operation instruction, and
- packing the name, the connection result, the input parameters, and the output parameters to obtain the fusion operation instruction.

A21. The method of A1, further comprising: executing the binary code of the deep learning algorithm in a deep learning processor through a runtime system.

A22. The method of A1, wherein, the operation data further includes tensor data, wherein, the tensor data includes a shape attribute, a logical data type attribute, a physical data type attribute, and a physical layout attribute.

A23. The method of A22, further comprising:
- extending the class of a deep learning framework, and encapsulating the tensor data and the operation instruction in the data of the deep learning framework to integrate the deep learning framework and the deep learning programming library interface.

A24. A deep learning algorithm compiling device, comprising:
- an operation data receiving module configured to receive operation data transferred by a deep learning programming library interface;
- an operation instruction obtaining module configured to obtain an operation instruction included in the operation data; and
- a compilation module configured to determine an instruction type of the operation instruction, and execute a compilation operation corresponding to the instruction type according to the determination result to obtain a binary code of the deep learning algorithm.

A25. The device of A24, wherein, the operation instruction is created or called according to a user instruction received by the deep learning programming library interface.

A26. The device of A25, wherein, the compiling module includes:
- a determination unit configured to determine an instruction type of an operation instruction, and
- a static search unit configured to, when the instruction type is a static operation instruction, search for a corresponding binary code in a static operation pool according to the name of the static operation instruction, and use the binary code as the binary code of the deep learning algorithm.

A27. The device of A26, wherein, the static search unit is configured to:
- according to the name of the static operation instruction, search for a binary code corresponding to the name in the static operation pool, and
- when the search result is success, return the binary code as the binary code of the deep learning algorithm.

A28. The device of A27, wherein, the static search unit is further configured to:
- when the search result is failure, use the static operation instruction as a dynamic operation instruction and perform just-in-time compilation.

A29. The device of A26, wherein, the static operation instruction includes one or more of a operation instruction, a build-in operation instruction, and an offline operation instruction, wherein,
- the customized operation instruction includes an operation instruction that has a customized function and that is implemented according to an encoding method and an encapsulation form of the operation instruction,
- the build-in operation instruction includes an own operation instruction that is included in the deep learning programming library interface, and
- the offline operation instruction includes a pre-compiled dynamic operation instruction, wherein, a pre-compiled result is stored in an offline cache.

A30. The device of A29, wherein, a process of generating a binary code corresponding to the customized operation instruction includes:
- according to the interface and a data structure definition of an operation instruction, encapsulating a user instruction corresponding to the operation instruction to obtain an encapsulated user instruction,
- compiling the encapsulated user instruction to obtain a compiling result, and
- inserting the compiling result into a static operation pool in a manner of dynamic link or static link to obtain the binary code corresponding to the customized operation instruction.

A31. The device of A29, wherein, the static operation pool includes a static operation source file, wherein, the static operation source file includes a static code segment, a static data segment, a dynamic code segment, and a dynamic data segment, wherein,
- the static code segment is used to store the binary code corresponding to the build-in operation instruction,
- the dynamic code segment is used to store the binary code corresponding to the customized operation instruction,
- the static data segment is used to store tensor data corresponding to the build-in operation instruction, and
- the dynamic data segment is used to store tensor data corresponding to the customized operation instruction.

A32. The device of A31, wherein, the static operation pool further includes an offline cache, wherein, the offline cache includes an offline file and an index table, wherein,
- the offline file is used to store a pre-compiled result of the offline operation instruction, and the index table is used to indicate a location where the pre-compiled result of the offline operation instruction is stored in the offline file.

A33. The device of A29, wherein, the static search unit is further configured to:
according to the name specified when the static operation instruction is created, in the static operation instruction operation pool, sequentially search for a binary code corresponding to the customized operation, a binary code corresponding to the build-in operation, and a binary code corresponding to the offline operation, so as to obtain the binary code corresponding to the name.

A34. The device of A26, wherein, the compiling module further includes a dynamic compilation unit that is configured to:
when the instruction type is a dynamic operation instruction, perform just-in-time compilation on the dynamic operation instruction to obtain a just-in-time compilation result as the binary code of the deep learning algorithm.

A35. The device of any of A24-A34, wherein, the dynamic compilation unit includes:
an original data obtaining subunit configured to, according to the dynamic operation instruction, obtain an original computational graph and original model data corresponding to the dynamic operation instruction,
a unified processing subunit configured to, according to the original computational graph and the original model data, perform unified processing for the deep learning algorithm to obtain a first computational graph and first model data,
a hardware instruction generation subunit configured to generate a hardware instruction and a data descriptor according to the first computational graph,
a model data processing subunit configured to process the first model data for the hardware platform according to the data descriptor to obtain second model data, and
a binary code generation subunit configured to obtain the binary code of the deep learning algorithm according to the hardware instruction and the second model data.

A36. The device of A35, wherein, the original data obtaining subunit is configured to:
obtain the original computational graph corresponding to the dynamic operation instruction by parsing the dynamic operation instruction, and
obtain the original model data according to parameters of the dynamic operation instruction.

A37. The device of A35, wherein, the unified processing subunit is configured to:
read the original computational graph and the original model data,
identify continuous linear transformation operation nodes in the original computational graph, and
process the continuous linear transformation operation nodes through linear transformation and constant folding to obtain a first computational graph and first model data.

A38. The device of A35, wherein, the hardware instruction generation subunit is configured to:
process the first computational graph according to a cost model, and use a heuristic search strategy to obtain a hardware instruction and a data descriptor.

A39. The device of A35, wherein, the model data processing subunit is configured to:
perform data alignment on the first model data according to the data descriptor and an operation requirement of the hardware platform, or,
perform dimensional transformation on the first model data according to the data descriptor and an operation requirement of the hardware platform, or,
select precision for the first model data according to the data descriptor and an operation requirement of the hardware platform.

A40. The device of A35, wherein, the binary code generation subunit is configured to:
obtain the binary code of the deep learning algorithm by packing the hardware instruction and the second model data.

A41. The device of A34, wherein, the dynamic operation instruction includes a specialized operation instruction and/or fusion operation instruction, wherein,
the specialized operation operation includes an operation instruction obtained by converting the operation instruction to which input parameters are bound, and
the fusion operation operation instruction includes an operation instruction obtained by combining a plurality of operation instructions according to a calling sequence.

A42. The device of A41, wherein, the specialized operation instruction includes a fully specialized operation instruction, a partial specialized operation instruction, and a pseudo-specialized operation instruction, wherein,
the fully specialized operation instruction includes an operation instruction obtained by converting the operation instruction to which all input parameters are bound,
the partial specialized operation instruction includes an operation instruction obtained by converting the operation instruction to which N input parameters are bound, wherein N is a positive integer less than a count of the input parameters of the operation instruction, and
the pseudo-specialized operation instruction includes an operation instruction obtained by converting the operation instruction to which input parameters are not bound.

A43. The device of A41, wherein, a process of creating the fusion operation instruction includes:
creating a name of the fusion operation instruction,
determining fusion operation sub-instructions according to operation instructions to be fused,
determining an operation connection relationship between the fusion operation sub-instructions according to a calling sequence of the operation instructions to be fused,
connecting the fusion operation sub-instructions according to the operation connection relationship to obtain a connection result,
setting input parameters and output parameters of the fusion operation instruction according to a user instruction corresponding to the fusion operation instruction, and
packing the name, the connection result, the input parameters, and the output parameters to obtain the fusion operation instruction.

A44. The device of A24, further comprising: an execution module configured to execute the binary code of the deep learning algorithm in a deep learning processor through a runtime system.

A45. The device of A24, wherein, the operation data further includes tensor data, wherein, the tensor data includes a shape attribute, a logical data type attribute, a physical data type attribute, and a physical layout attribute.

A46. The device of A45, wherein the device is further configured to:
extend the class of a deep learning framework, and encapsulate the tensor data and the operation instruction in the data of the deep learning framework to integrate the deep learning framework and the deep learning programming library interface.

A47. A deep learning operation device, comprising one or more of the deep learning algorithm compiling device of any of A24-A46, wherein, the deep learning operation device is used to complete a preset deep learning operation.

A48. A combined operation device, comprising one or more of the deep learning operation devices of A47, a universal interconnection interface, and other processing devices; and
the deep learning operation device interacts with the another processing device to perform operations specified by a user.

A49. A deep learning chip, comprising:
the deep learning algorithm compiling device of any of A24-A46; or
the deep learning operation device of A47; or
the combined operation device of A48.

A50. An electronic device comprising:
the deep learning algorithm compiling device of any of A24-A46; or
the deep learning operation device of A47; or
the combined operation device of A48; or,
the deep learning chip of A49.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change or transform the implementation and application scope according to the ideas of the present application. The changes and transformations shall all fall within the protection scope of the present disclosure. In summary, the content of this specification should not be construed as a limitation on the present disclosure.

What is claimed:

1. A deep learning algorithm compiling method, comprising:
receiving operation data transferred by a deep learning programming library interface;
wherein, the operation data is created or called according to a user instruction received by the deep learning programming library interface;
obtaining an operation instruction included in the operation data; and
determining an instruction type of the operation instruction, and
executing a compilation operation corresponding to the instruction type according to the determination result to obtain a binary code of the deep learning algorithm;
when the instruction type is a static operation instruction, searching for a corresponding binary code in a static operation pool according to the name of the static operation instruction, and using the binary code as the binary code of the deep learning algorithm;
when the instruction type is a dynamic operation instruction, performing just-in-time compilation on the dynamic operation instruction to obtain a just-in-time compilation result as the binary code of the deep learning algorithm;

wherein, the dynamic operation instruction includes a specialized operation instruction and/or a fusion operation instruction, wherein, the specialized operation includes an operation instruction obtained by converting the operation instruction to which input parameters are bound, and the fusion operation instruction includes an operation instruction obtained by combining a plurality of operation instructions according to a calling sequence; and
wherein, the specialized operation instruction includes a fully specialized operation instruction, a partial specialized operation instruction, and a pseudo-specialized operation instruction, wherein, the fully specialized operation instruction includes an operation instruction obtained by converting the operation instruction to which all input parameters are bound, the partial specialized operation instruction includes an operation instruction obtained by converting the operation instruction to which N input parameters are bound, wherein N is a positive integer less than a count of the input parameters of the operation instruction, and the pseudo-specialized operation instruction includes an operation instruction obtained by converting the operation instruction to which input parameters are not bound.

2. The method of claim 1, wherein, when the instruction type is the static operation instruction, searching for a corresponding binary code in the static operation pool according to the name of the static operation instruction, and using the binary code as the binary code of the deep learning algorithm include:
according to the name of the static operation instruction, searching for a binary code corresponding to the name in the static operation pool, and
when the search result is success, returning the binary code as the binary code of the deep learning algorithm.

3. The method of claim 2, wherein, when the instruction type is the static operation instruction, searching for a corresponding binary code in the static operation pool according to the name of the static operation instruction, and using the binary code as the binary code of the deep learning algorithm further include:
when the search result is failure, using the static operation instruction as a dynamic operation instruction and performing just-in-time compilation.

4. The method of claim 1, wherein, the static operation instruction includes one or more of a customized operation instruction, a build-in operation instruction, and an offline operation instruction, wherein,
the customized operation instruction includes an operation instruction that has a customized function and that is implemented according to an encoding method and an encapsulation form of the operation instruction,
the build-in operation instruction includes an own operation instruction that is included in the deep learning programming library interface, and
the offline operation instruction includes a pre-compiled dynamic operation instruction, wherein, a pre-compiled result is stored in an offline cache.

5. The method of claim 4, wherein, a process of generating a binary code corresponding to the customized operation instruction includes:
according to the interface and a data structure definition of an operation instruction, encapsulating a user instruction corresponding to the operation instruction to obtain an encapsulated user instruction, compiling the encapsulated user instruction to obtain a compiling result, and inserting the compiling result into a static operation pool in a manner of dynamic link or static link to obtain the binary code corresponding to the customized operation instruction.

6. The method of claim 4, wherein, the static operation pool includes a static operation source file, wherein, the static operation source file includes a static code segment, a static data segment, a dynamic code segment, and a dynamic data segment, wherein,
the static code segment is used to store the binary code corresponding to the build-in operation instruction,
the dynamic code segment is used to store the binary code corresponding to the customized operation instruction,
the static data segment is used to store tensor data corresponding to the build-in operation instruction, and
the dynamic data segment is used to store tensor data corresponding to the customized operation instruction.

7. The method of claim 6, wherein, the static operation pool further includes an offline cache, wherein, the offline cache includes an offline file and an index table, wherein,
the offline file is used to store a pre-compiled result of the offline operation instruction, and
the index table is used to indicate a location where the pre-compiled result of the offline operation instruction is stored in the offline file.

8. The method of claim 4, wherein, according to the name of the static operation instruction, searching for a binary code corresponding to the name in the static operation pool includes:
according to the name specified when the static operation instruction is created, in the static operation pool, sequentially searching for a binary code corresponding to the customized operation, a binary code corresponding to the build-in operation, and a binary code corresponding to the offline operation, so as to obtain the binary code corresponding to the name.

9. The method of claim 1 wherein, when the operation instruction includes a dynamic operation instruction, performing just-in-time compilation on the dynamic operation instruction to obtain a just-in-time compilation result as the binary code of the deep learning algorithm includes:
according to the dynamic operation instruction, obtaining an original computational graph and original model data corresponding to the dynamic operation instruction,
according to the original computational graph and the original model data, performing unified processing for the deep learning algorithm to obtain a first computational graph and first model data,
generating a hardware instruction and a data descriptor according to the first computational graph,
processing the first model data for the hardware platform according to the data descriptor to obtain second model data, and
obtaining the binary code of the deep learning algorithm according to the hardware instruction and the second model data.

10. The method of claim 9, wherein, according to the dynamic operation instruction, obtaining an original computational graph and original model data corresponding to the dynamic operation instruction includes:
obtaining the original computational graph corresponding to the dynamic operation instruction by parsing the dynamic operation instruction, and
obtaining the original model data according to parameters of the dynamic operation instruction.

11. The method of claim 9, wherein, according to the original computational graph and the original model data, performing unified processing for the deep learning algorithm to obtain a first computational graph and first model data includes:
reading the original computational graph and the original model data, identifying continuous linear transformation operation nodes in the original computational graph, and
processing the continuous linear transformation operation nodes through linear transformation and constant folding to obtain a first computational graph and first model data.

12. The method of claim 9, wherein, generating a hardware instruction and a data descriptor according to the first computational graph includes:
processing the first computational graph according to a cost model, and using a heuristic search strategy to obtain a hardware instruction and a data descriptor.

13. The method of claim 9, wherein, processing the first model data for the hardware platform according to the data descriptor to obtain second model data includes:
performing data alignment on the first model data according to the data descriptor and an operation requirement of the hardware platform, or,
performing dimensional transformation on the first model data according to the data descriptor and an operation requirement of the hardware platform, or,
selecting precision for the first model data according to the data descriptor and an operation requirement of the hardware platform.

14. The method of claim 9, wherein, obtaining the binary code of the deep learning algorithm according to the hardware instruction and the second model data includes:
obtaining the binary code of the deep learning algorithm by packing the hardware instruction and the second model data.

15. The method of claim 1, wherein, a process of creating the fusion operation instruction includes: creating a name of the fusion operation instruction, determining fusion operation sub-instructions according to operation instructions to be fused, determining an operation connection relationship between the fusion operation sub-instructions according to a calling sequence of the operation instructions to be fused, connecting the fusion operation sub-instructions according to the operation connection relationship to obtain a connection result, setting input parameters and output parameters of the fusion operation instruction according to a user instruction corresponding to the fusion operation instruction, and packing the name, the connection result, the input parameters, and the output parameters to obtain the fusion operation instruction.

* * * * *